(12) United States Patent
Kon et al.

(10) Patent No.: US 8,599,491 B2
(45) Date of Patent: Dec. 3, 2013

(54) ZOOM LENS AND ELECTRONIC IMAGING APPARATUS INCORPORATING THE SAME

(75) Inventors: Toyoki Kon, Hachioji (JP); Keisuke Ichikawa, Tama (JP)

(73) Assignee: Olympus Imaging Corp., Tokyo (JP)

( * ) Notice: Subject to any disclaimer, the term of this patent is extended or adjusted under 35 U.S.C. 154(b) by 91 days.

(21) Appl. No.: 13/200,089

(22) Filed: Sep. 15, 2011

(65) Prior Publication Data
US 2012/0075716 A1   Mar. 29, 2012

(30) Foreign Application Priority Data
Sep. 28, 2010   (JP) ................... 2010-216388

(51) Int. Cl.
*G02B 15/14*   (2006.01)
*G02B 9/62*   (2006.01)

(52) U.S. Cl.
USPC ............................. 359/683; 359/684; 359/758

(58) Field of Classification Search
USPC .......................................... 359/683, 684, 758
See application file for complete search history.

(56) References Cited

U.S. PATENT DOCUMENTS 7,511,898 B2 *   3/2009   Matsui .................... 359/758

FOREIGN PATENT DOCUMENTS

| JP | 2008-129238 | 6/2008 |
| JP | 2008-225314 | 9/2008 |
| JP | 2009-069671 | 4/2009 |
| JP | 2009-192771 | 8/2009 |

* cited by examiner

*Primary Examiner* — Jack Dinh
(74) *Attorney, Agent, or Firm* — Kenyon & Kenyon LLP

(57) ABSTRACT

The zoom lens of the invention comprises, in order from an object side thereof, a first lens group having positive refracting power, a second lens group having negative refracting power, a third lens group having positive refracting power, a fourth lens group having positive refracting power, a fifth lens group having negative refracting power, and a sixth lens group having positive refracting power. The first lens group includes a reflective optical element, and the lens component in, and on the most image side of, the fourth lens group has negative refracting power.

22 Claims, 14 Drawing Sheets

Example 1

FIG.2
Example 2
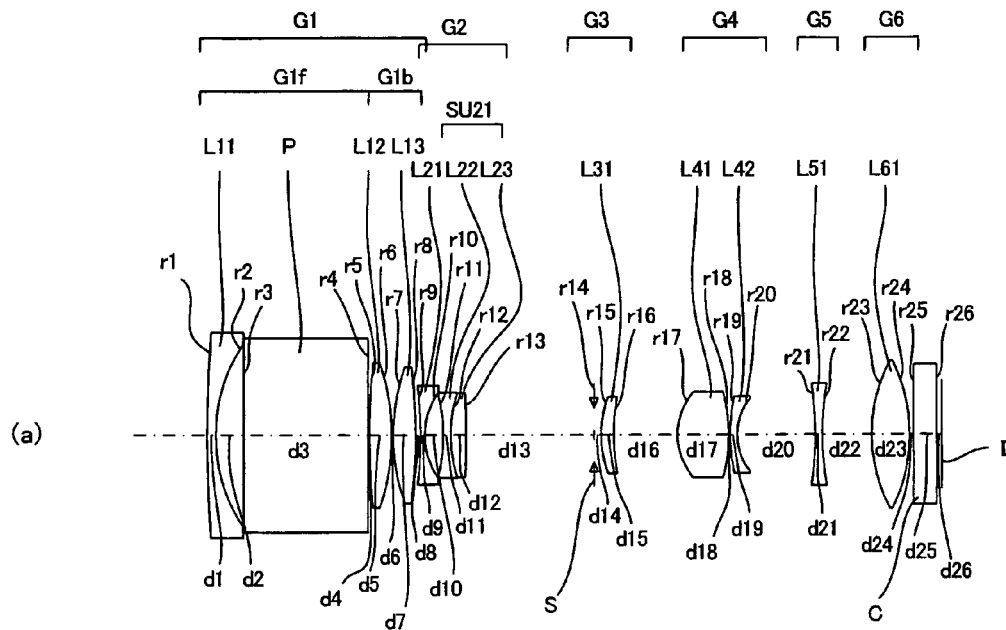
(a)
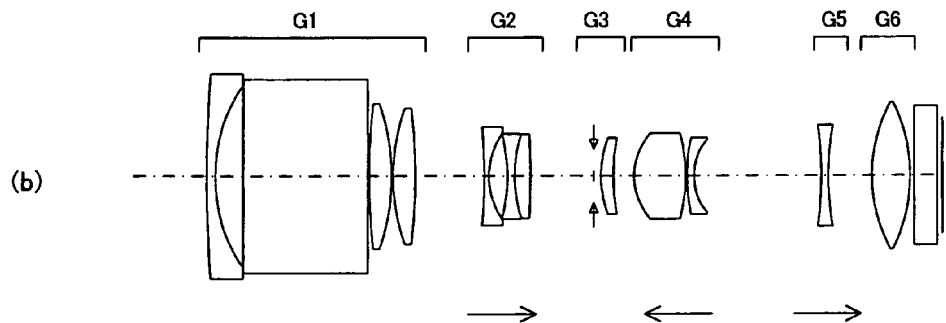
(b)
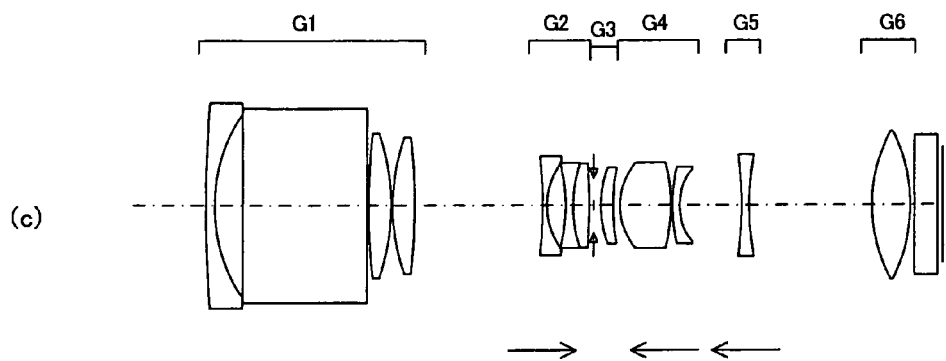
(c)

Example 3

FIG.5
Example 5
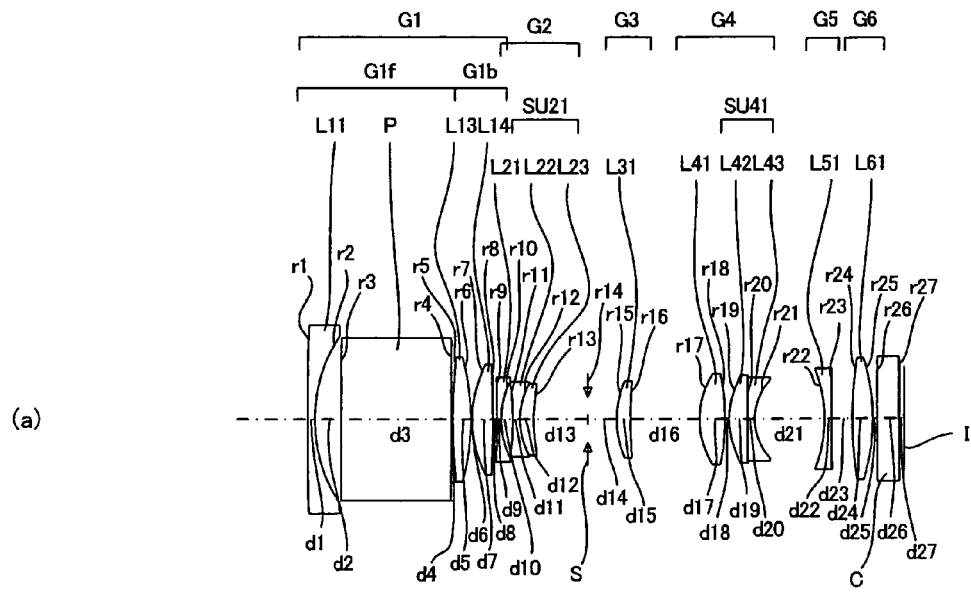
(a)
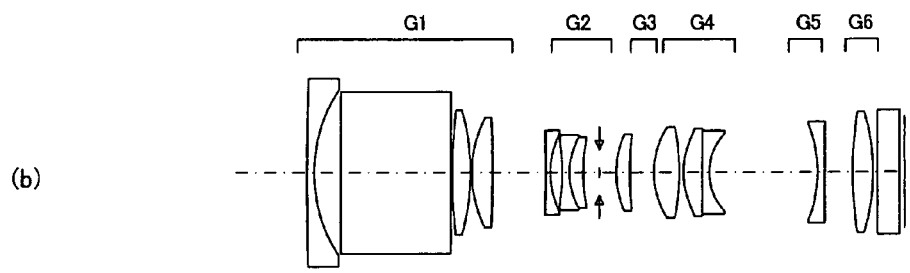
(b)
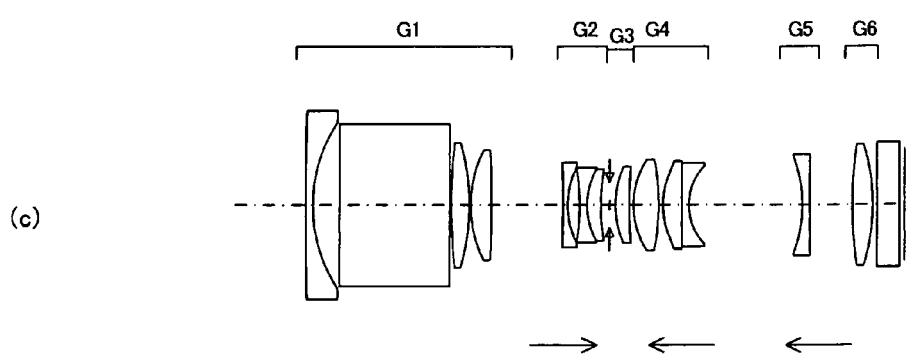
(c)

FIG.6
Example 6
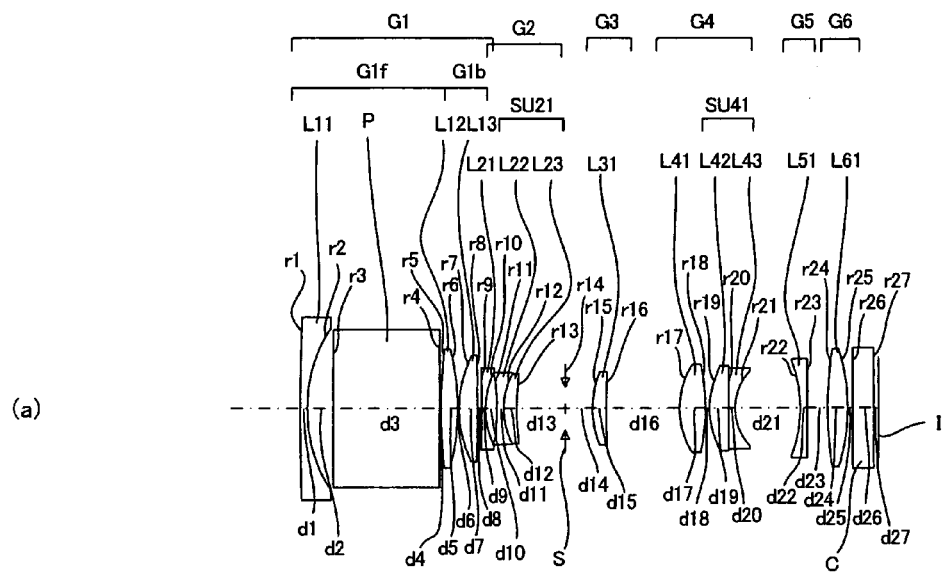
(a)
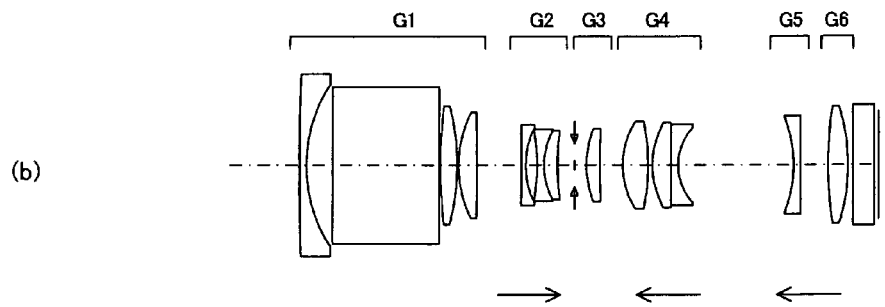
(b)
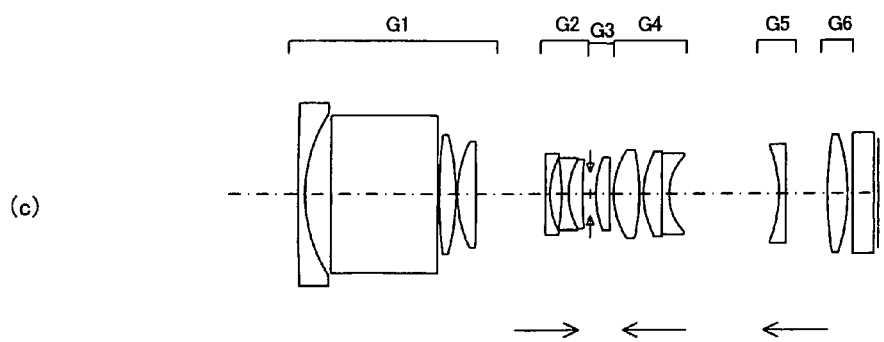
(c)

ZOOM LENS AND ELECTRONIC IMAGING APPARATUS INCORPORATING THE SAME

BACKGROUND OF THE INVENTION

For an optical system used with electronic imaging apparatus like digital cameras and digital video cameras, it is now required to have small-format size and optical performance high enough to be well corrected for aberrations. As one approach to achieving size reduction, there has been a bending or flexion optical system known in the art that includes a reflective optical element inside as well as an electronic imaging apparatus incorporating the same.

For the bending optical systems including a reflective optical element, a small-format imaging optical system of positive-negative-positive-positive-negative-positive six-groups construction has been known as set forth in the following patent publications.

JP(A)'s 2009-69671, 2009-192771, 2008-225314 and 2008-129238 have proposed a high-zoom-ratio bending optical system of the positive-negative-positive-positive-negative-positive six-groups construction wherein the second, the fourth and the fifth lens groups are used as zooming groups and the fourth and/or the fifth lens group are used as focusing lens groups.

SUMMARY OF THE INVENTION

According to one aspect of the invention, there is a zoom lens provided, which comprises, in order from an object side thereof, a first lens group having positive refracting power, a second lens group having negative refracting power, a third lens group having positive refracting power, a fourth lens group having positive refracting power, a fifth lens group having negative refracting power and a sixth lens group having positive refracting power, characterized in that the first lens group includes a reflective optical element, and the lens component in and on the most image side of the fourth lens group has negative refracting power.

According to the zoom lens of this aspect wherein the first lens group includes a reflective optical element so that the optical path involved can be bent or flexed in any desired direction, there is no need for popping up a lens barrel from an imaging apparatus body during use, unlike a received-in-a-lens-mount type optical system. It is thus possible to bend the optical axis for location, thereby achieving an imaging apparatus of much smaller size in the depth direction.

Because the negative lens component in, and on the most image side of, the fourth lens group has negative refracting power, the front principal point position of the fourth lens group may be set more on the object side. This in turn enables the fourth lens group to be located more on the image side than could be achieved so far in the art even at the wide-angle end where the air separation between the third and the fourth lens group grows the widest; so the zooming space can be more effectively used than in the prior art.

As the lens component in and on the most image side of the fourth lens group fluctuates during zooming, it gives rise to fluctuations of aberrations such as coma and meridional field curvature. Because the lens component in and on the most image side of the fourth lens group has negative refracting power, however, those aberration fluctuations are well corrected. Moreover, this arrangement enables the lens groups on the image side with respect to the fourth lens group to work for focusing rather than zooming. In another parlance, focusing may be implemented with the lens groups that are not the zooming groups.

Consequently, sufficient zoom ratios are ensured while keeping the zooming space small; so it is possible to obtain a compact zoom lens that combines a satisfactory focusing feature with satisfactory optical performance.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 is a sectional view, as taken along the optical axis, of the optical arrangements of the zoom lens according to Example 2 upon focusing on an infinite object (a) at the wide-angle end, (b) in an intermediate setting, and (c) at the telephoto end.

FIG. 5 is a sectional view, as taken along the optical axis, of the optical arrangements of the zoom lens according to Example 5 upon focusing on an infinite object (a) at the wide-angle end, (b) in an intermediate setting, and (c) at the telephoto end.

FIG. 6 is a sectional view, as taken along the optical axis, of the optical arrangements of the zoom lens according to Example 6 upon focusing on an infinite object (a) at the wide-angle end, (b) in an intermediate setting, and (c) at the telephoto end.

DESCRIPTION OF EXEMPLARY EMBODIMENTS

Figure 1:
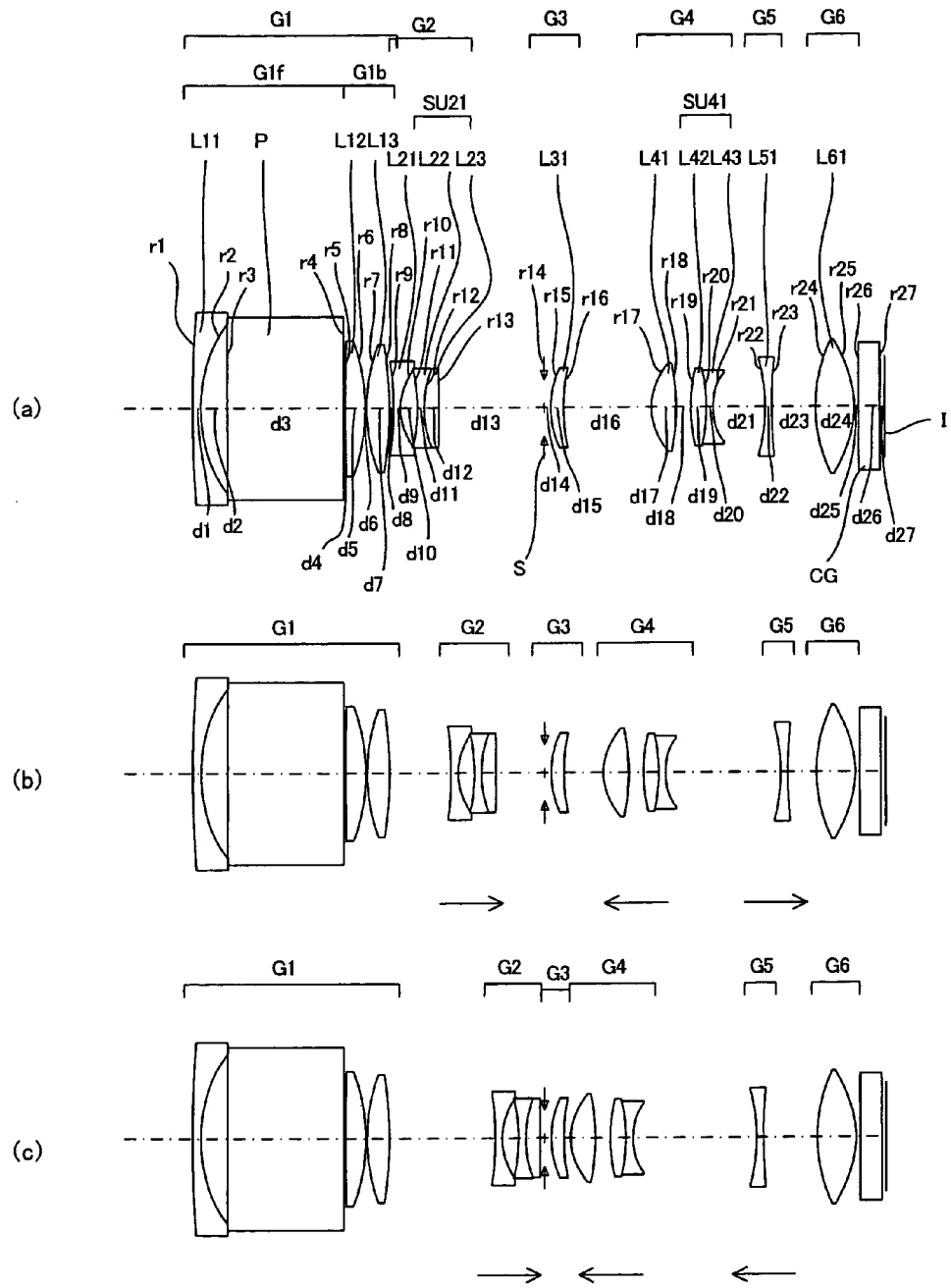
FIG. 1 is a sectional view, as taken along the optical axis, of the optical arrangements of the zoom lens according to Example 1 upon focusing on an infinite object (a) at the wide-angle end, (b) in an intermediate setting, and (c) at the telephoto end.

While the advantages of the exemplary zoom lens constructions set forth hereinafter are now explained, it is to be understood that the invention is by no means limited to them. The explanation of the exemplary zoom lenses includes a lot of specific details for illustration; however, it would be obvious for those skilled in the art that variations added to those details do not deviate from the scope of the invention. Therefore, the exemplary examples of the invention set forth hereinafter are given without getting rid of the generality of the invention for which rights are sought or imposing any limitation thereon.

For the zoom lens exemplified herein, it is desirable to comprise, in order from the object side thereof, the first lens group having positive refracting power, the second lens group having negative refracting power, the third lens group having positive refracting power, the fourth lens group having positive refracting power, the fifth lens group having negative refracting power and the sixth lens group having positive refracting power, wherein the first lens group includes a reflective optical element, and the lens component in and on the most image side of the fourth lens group has negative refracting power.

The arrangement here is designed such that the optical path involved can be bent or flexed by reflection in any desired direction because the first lens group includes a reflective optical element; so there is no risk of a lens barrel popping up from an imaging apparatus body during use, unlike the received-in-a-lens-mount type optical system. And this arrangement may be configured as a small-format imaging apparatus that is slimmed down by the bending optical system in the depth direction.

To put it another way, it is possible to provide a zoom lens that is a bending optical system including a reflective optical element, which is of small-format size and combines a satisfactory focusing feature with satisfactory optical performance as well as an electronic imaging apparatus incorporating the same.

It is here noted that the "reflective optical element" means an element capable of bending the optical path involved such as the optical axis by reflection in any desired direction. For instance, there is the mention of a mirror, and a prism.

To curtail the full length of the bending optical system that is of the positive-negative-positive-positive-negative-position six-groups construction and includes the reflective optical element, the refracting power of each lens group must be strong and, at the same time, the air separation must be diminished. Especially, letting the zooming groups have strong refracting power thereby diminishing the air separation is effective for full-length reduction. As the full length of the optical system is curtailed while keeping hold of high zoom ratios, however, there is no option but to make the refracting power of each lens group strong, and no option but to narrow down the space necessary for zooming, imposing some limitations on size reduction.

For instance, reference is made to JP(A) 2009-69671, JP(A) 2009-192771, JP(A) 2008-225314, and JP(A) 2008-129238 as mentioned above. The separation between the zooming groups: the fourth lens group of positive power and the third lens group of positive power remains too narrow to take up the necessary and sufficient zooming space, rendering it difficult to make the full length of the optical system short any more.

Here, if the lens component in and on the most image side of the fourth lens group of positive power is allowed to have negative refracting power as mentioned above, then it enables the front principal point of the fourth lens group to be positioned more on the object side. This in turn enables the fourth lens group to be positioned more on the image side than could be achieved so far in the art even at the wide-angle end where the air separation between the third and the fourth lens group grows the widest, resulting in the ability to make more effective use of the zooming space than in the prior art. It is thus possible to obtain a small-format zoom lens that makes sure sufficient zoom ratios while keeping the zooming space small.

Preferably, at least two surfaces as counted from the surface in and on the most object side of the fourth lens group are converging surfaces.

If at least two surfaces as counted from the surface in and on the most object side of the fourth lens group are converging surfaces or, in another parlance, convex surfaces, then it enables the front principal point of the fourth lens group to be positioned more on the object side; so it is possible to obtain a small-format zoom lens that is much more curtailed in terms of full length. At the same time, it facilitates correction of spherical aberrations and coma.

Patent Publication 1 teaches that the fourth lens group is made up of one double-convex lens component, and the fifth lens group is made up of one negative lens concave on its image side. It turns out that it fails to locate the front principal point position of the fourth lens group on the object side. In consideration of a combined system of the fourth with the fifth lens group, on the other hand, the front principal point position could be taken as being located on the object side. However, as the relative positions of both fluctuate during zooming or focusing, especially as there are fluctuations of the converging surface in, and on the most object side of, the fourth lens group and of the diverging surface in, and on the most image side of, the fifth lens group, it renders it very difficult to make good enough correction of fluctuations of aberrations such as coma and meridional field curvature.

Preferably to this end, the surface convex on its object side, located on the most object side and the surface concave on its image side, located on the most image side are held in the same fourth lens group of positive power, and they are moved in unison. This cooperates with the negative refracting power of the lens component in and on the most image side of the fourth lens group to locate the front principal point position of the fourth lens group more on the object side, resulting in a curtailing of the full length of the optical system, and the ability to hold back aberration fluctuations in association with it. And apart from that, the fifth lens group of negative power must be left for the purpose of further improvements in optical performance (reduced or minimized aberration fluctuations) as well as for focusing purposes.

More preferably, the lens surface in and on the most image side of the fourth lens group should be an aspheric surface.

Configuring the lens surface in and on the most image side of the fourth lens group as an aspheric surface makes possible satisfactory correction of coma and field curvature in particular.

It is here to be noted that the "lens component" refers to a lens with no air separation sandwiched between the most-object-side surface and the most-image-side surface; a single lens, a cemented lens, a composite lens, a refracting-power-variable lens, etc. are each counted as one lens component.

For the zoom lens, it is preferable that at least one air lens that satisfies the following Condition (14) is in the fourth lens group:

$$-0.45 \leq (R_{G4m1}+R_{G4m2})/(R_{G4m2}-R_{G4m1}) \leq 6 \quad (14)$$

where $R_{G4m1}$ is the radius of curvature of the object-side surface of the air lens in the fourth lens group in the zoom lens, and $R_{G4m2}$ is the radius of curvature of the image-side surface of the air lens in the fourth lens group in the zoom lens.

In Condition (14), the shape of the air lens in the fourth lens group is defined in terms of a numerical formula. The satisfaction of Condition (14) enables satisfactory correction of spherical aberrations, field curvature and chromatic aberration of magnification all over the area from the wide-angle end to the telephoto end.

Exceeding the upper limit value of Condition (14) causes spherical aberrations to remain under, field curvature to remain over, and chromatic aberration of magnification to go worse all over the area from the wide-angle end to the telephoto end, resulting in difficulty obtaining satisfactory optical performance.

Being short of the lower limit value of Condition (14) causes spherical aberrations to remain over, field curvature to remain under, and chromatic aberration of magnification to go worse, resulting in difficulty obtaining satisfactory optical performance.

It is more preferable to satisfy the following Condition (14)' instead of Condition (14):

$$-0.3 \leq (R_{G4m1}+R_{G4m2})/(R_{G4m2}-R_{G4m1}) \leq 3 \quad (14)'$$

It is even more preferable to satisfy the following Condition (14)' instead of Condition (14) and Condition (14)':

$$-0.28 \leq (R_{G4m1}+R_{G4m2})/(R_{G4m2}-R_{G4m1}) \leq 2 \quad (14)''$$

For the inventive zoom lens here, it is desirable that the fifth lens group is movable upon zooming from the wide-angle end to the telephoto end as well as upon focusing.

Referring here to an optical system such as a digital camera, which lens or which lens group is used for focusing is of importance for the purpose of achieving size reduction while keeping high zoom ratios, especially a full-length curtailing of the optical system. What is needed for focusing is the space for movement of that lens or that lens group. To curtail the full length of the optical system while its zoom ratio is kept high, the refracting power of each lens, especially each lens in the zooming group must be strong and, at the same time, the air separation must be diminished, as described above. In other words, the air separation must be diminished while the focusing space is ensured. This tendency gets more noticeable as the zoom ratio grows high.

Patent Publications 1 to 4 have proposed using a zooming group also as a focusing group. As focusing is implemented with the zooming group, it allows for a large focal position change relative to the amount of lens movement for focusing so that focusing can be implemented by reduced lens movement, viz., in a reduced space. In an optical system having a high zoom ratio and a curtailed full length, however, the refracting power of the zooming group in particular grows too strong; so there is too large a focal position change relative to the amount of lens movement at the time of focusing. Therefore, it is very difficult to have fine control over lens movement and implement precise focusing.

Patent Publication 4 has proposed that focusing is implemented with the fourth lens group of positive power and/or the fifth lens group of negative power, both being the zooming groups, to reduce or minimize the focal position change relative to the amount of lens movement. However, the movement of two lens groups upon focusing leaves the lens barrel mechanism complicated, resulting in much difficulty obtaining a small-format imaging apparatus.

With the zooming groups used as the lens groups for focusing as described above, it is very difficult to achieve high zoom ratios and curtailed full length.

Referring to Patent Publications 2 to 4, high zoom ratios are imparted to a bending or flexion optical system of the positive-negative-positive-positive-negative-positive six-groups construction by using as zooming groups three lens groups: the second lens group of negative power, the fourth lens group of positive power and the fifth lens group of negative power or the second lens group of negative power, the fourth lens group of positive power and the sixth lens group of positive power, with the remaining three fixed.

If this construction is used for high zoom ratios and curtailed full length, the zooming or fixed groups must also be used for the lens groups for focusing. It is not preferable to move the three groups at the time of zooming and move the fixed groups only at the time of focusing, because the mechanism involved gets complicated. For this reason, for instance, it is required to undermine the refracting power of one of the zooming lens groups to get rid of its substantial zooming function, thereby using that lens group as a lens group for focusing.

For the positive-negative-positive-positive-negative-positive six-groups construction, it is easier to impart a substantial zooming function mainly to the second lens group of negative power and the fourth lens group of positive power. On the other hand, the fifth lens group of negative power is less contributable to zooming than two such lens groups. For this reason, it is preferable to turn the zooming function of the fifth lens group of negative power over the second lens group of negative power and the fourth lens group of positive power, and use only the fifth lens group for focusing. It is also preferable for the fifth lens group to move, because of working in favor of performance improvements such as reduction or minimization of aberration fluctuations occurring at the time of zooming from the wide-angle end to the telephoto end.

In the instant embodiment of the invention, the fourth lens group is designed such that the lens component in and on the most image side of it has negative refracting power. It is thus possible to undermine the zooming function (refracting power) of the fourth lens group while the sufficient zoom ratio is ensured throughout the optical system. Thus, it is possible for the fifth lens group to function as a lens group for correction of focal position fluctuations and aberration fluctuations occurring at the time of zooming plus for focusing.

It follows that by designing the fifth lens group to be movable at the time of zooming from the wide-angle end to the telephoto end and at the time of focusing, it is possible to obtain a zoom lens that has a high zoom ratio and a curtailed full length and is easy to control.

For the fifth lens group, it is preferable to keep moving at an imaging magnification of as low as 1/50 or lower.

For the zoom lens according to the embodiment here, it is preferable to satisfy the following Condition (1):

$$-3 \leq F_{G5}/F_{G6} \leq -0.91 \tag{1}$$

where $F_{G5}$ is the focal length of the fifth lens group, and $F_{G6}$ is the focal length of the sixth lens group.

Condition (1) defines the focal length ratio between the fifth lens group and the sixth lens group in the zoom lens. The satisfaction of Condition (1) results in a zoom lens that is curtailed in terms of full length and has an easy-to-control, satisfactory focusing function.

Exceeding the upper limit value of Condition (1) causes the focal position change to grow too large relative to the amount of lens movement in the fifth lens group, rendering control harder and resulting in difficulty obtaining a satisfactory focusing function.

Being short of the lower limit value of Condition (1) causes the focal position change to become small relative to the amount of lens movement in the first lens group; so there is the need for the space necessary for focusing, which renders it difficult to obtain a zoom lens having a curtailed full length. It is also difficult to correct the zoom lens for various fluctuations such as aberration fluctuations and exit pupil fluctuations occurring upon zooming.

It is more preferable to satisfy the following Condition (1)' instead of Condition (1):

$$-2.0 \leq F_{G5}/F_{G6} \leq -0.91 \tag{1}'$$

It is even more preferable to satisfy the following Condition (1)" instead of Condition (1) and (1)':

$$-1.9 \leq F_{G5}/F_{G6} \leq -0.93 \tag{1}"$$

For the zoom lens according to the embodiment here, it is preferable to satisfy the following Condition (2):

$$-6 \leq F_{G5}/F_W \leq -2.2 \tag{2}$$

where $F_{G5}$ is the focal length of the fifth lens group, and $F_W$ is the focal length of the zoom lens at the wide-angle end.

Condition (2) defines the ratio between the focal length of the fifth lens group in the zoom lens and the focal length of the zoom lens at the wide-angle end. The satisfaction of Condition (2) results in a zoom lens optical system that has a curtailed full length and an easy-to-control, satisfactory focusing function.

Exceeding the upper limit value of Condition (2) causes the refracting power of the fifth lens group to grow too strong, giving rise to too large a focal position change relative to the amount of lens movement. This in turn renders control over the movement of the lens group more difficult, resulting in difficulty obtaining a satisfactory focusing function.

Being short of the lower limit value of Condition (2) causes the refracting power of the fifth lens group to become weak; so the focal position change becomes small relative to the amount of lens movement. This in turn gives rise to an increase in the amount of movement of the lens group necessary for focusing, resulting in the need for another space for that. As a result, it is difficult to obtain a zoom lens optical system having a curtailed full length. It is also difficult to make correction of various fluctuations such as aberration fluctuations and exit pupil position fluctuations occurring upon zooming.

It is more preferable to satisfy the following Condition (2)' instead of Condition (2):

$$-5 \leq F_{G5}/F_W \leq -2.2 \tag{2}'$$

It is even more preferable to satisfy the following Condition (2)" instead of Condition (2):

$$-4.5 \leq F_{G5}/F_W \leq -2.2 \tag{2}"$$

For the zoom lens according to the embodiment here, it is preferable to satisfy the following Condition (3):

$$-1.50 \leq F_{G5}/F_T \leq -0.32 \tag{3}$$

where $F_{G5}$ is the focal length of the fifth lens group, and $F_T$ is the focal length of the zoom lens at the telephoto end.

Condition (3) defines the ratio between the focal length of the fifth lens group in the zoom lens and the focal length of the zoom lens at the telephoto end. The satisfaction of Condition (3) results in a zoom lens optical system that has a more curtailed full length and an easy-to-control, satisfactory focusing function.

Exceeding the upper limit value of Condition (3) causes the refracting power of the fifth lens group to grow too strong, giving rise to too large a focal position change relative to the amount of lens movement, leading to the need for having fine control over the amount of movement and, hence, rendering precise focusing difficult.

Being short of the lower limit value of Condition (3) causes the refracting power of the fifth lens group to become weak; so the focal position change relative to the amount of lens movement becomes small at the wide-angle end in particular. In addition, the amount of lens movement for focusing grows large at the telephoto end. This in turn gives rise to an increase in the amount of movement necessary for focusing, resulting in the need for another space for that. As a result, it is difficult to obtain a zoom lens optical system having a more curtailed full length. It is also difficult to make correction of various fluctuations such as aberration fluctuations and exit pupil position fluctuations occurring upon zooming.

It is more preferable to satisfy the following Condition (3)' instead of Condition (3):

$$-1.30 \leq F_{G5}/F_T \leq -0.32 \tag{3}'$$

It is even more preferable to satisfy the following Condition (3)" instead of Condition (3):

$$-1.15 \leq F_{G5}/F_T \leq -0.32 \tag{3}"$$

For the zoom lens according to the embodiment here, it is preferable to satisfy the following Condition (4):

$$-15 \leq (R_{G4L}+R_{G4M})/(R_{G4L}-R_{G4M}) \leq -1.5 \tag{4}$$

where $R_{G4M}$ is the radius of curvature of the object-side surface of the lens component in and on the most image side of the fourth lens group, and $R_{G4L}$ is the radius of curvature of the image-side surface of the lens component in and on the most image side of the fourth lens group.

In Condition (4), the shape of the lens component in and on the most image side of the fourth lens group in the zoom lens is defined in terms of a numerical formula. The satisfaction of Condition (4) makes it possible to implement satisfactory correction of spherical aberrations, field curvature, longitudinal chromatic aberration and chromatic aberration of magnification all over area from the wide-angle end to the telephoto end.

Exceeding the upper limit value of Condition (4) causes spherical aberrations to remain over, meridional field curvature to remain over, and longitudinal chromatic aberration and higher-order chromatic aberration of magnification to go worse, resulting in difficulty obtaining satisfactory optical performance. It also fails to sufficiently let out the front principal point position of the fourth lens group on the object side, working against the full-length curtailing of the optical system.

Falling short of the lower limit value of Condition (4) causes spherical aberration to remain under, meridional field curvature to remain under, and longitudinal chromatic aberration and chromatic aberration of magnification to go worse, resulting in difficulty obtaining satisfactory optical performance.

It is more preferable to satisfy the following Condition (4)' instead of Condition (4):

$$-12 \leq (R_{G4L}+R_{G4M})/(R_{G4L}-R_{G4M}) \leq -1.5 \qquad (4)'$$

It is ever more preferable to satisfy the following Condition (4)" instead of Condition (4):

$$-9 \leq (R_{G4L}+R_{G4M})/(R_{G4L}-R_{G4M}) \leq -1 \qquad (4)''$$

For the zoom lens according to the embodiment here, it is preferable to satisfy the following Condition (5):

$$0.9 \leq F_{W5G6G}/F_{T5G6G} \leq 2.3 \qquad (5)$$

where $F_{W5G6G}$ is the combined focal length of the fifth lens group and the sixth lens group at the wide-angle end, and $F_{T5G6G}$ is the combined focal length of the fifth lens group and the sixth lens group at the telephoto end.

Condition (5) defines the ratio between the combined focal length of the fifth lens group and the sixth lens group at the wide-angle end and the combined focal length of the fifth lens group and the sixth lens group at the telephoto end of the zoom lens. The satisfaction of Condition (5) results in the ability to obtain a zoom lens optical system having a curtailed full length and an easy-to-control, satisfactory focusing function.

Exceeding the upper limit value of Condition (5) causes the zooming function or refracting power of the fifth lens group to grow strong, rendering the focal position change larger relative to the amount of lens movement. There is then the need for fine control over the amount of lens movement, rendering precise focusing difficult.

Falling short of the lower limit value of Condition (5) causes the air separation between the fifth lens group and the sixth lens group to decrease at the telephoto end of, especially, a zoom lens optical system having a curtailed full length, rendering focusing by the fifth lens group difficult.

It is more preferable to satisfy the following Condition (5)' instead of Condition (5):

$$0.9 \leq F_{W5G6G}/F_{T5G6G} \leq 2.1 \qquad (5)'$$

It is even more preferable to satisfy the following Condition (5)" instead of Condition (5):

$$0.95 \leq F_{W5G6G}/F_{T5G6G} \leq 2.05 \qquad (5)''$$

For the zoom lens according to the embodiment here, it is preferable to satisfy the following Condition (6):

$$0.95 \leq MG_{G5T}/MG_{G5W} \leq 1.25 \qquad (6)$$

where $MG_{G5W}$ is the transverse magnification of the fifth lens group at the time when the zoom lens is at the wide-angle end, and $MG_{G5T}$ is the transverse magnification of the fifth lens group at the time when the zoom lens is at the telephoto end.

Condition (6) defines the ratio between the transverse magnification of the fifth lens group in the zoom lens at the wide-angle end, and the transverse magnification of the fifth lens group at the telephoto end. The satisfaction of Condition (6) makes satisfactory optical performance and precise focusing possible.

Exceeding the upper limit value of Condition (6) causes some considerable zooming to take place at the fifth lens group or, in another parlance, the refracting power of the fifth group to grow large, giving rise to too large a focal position change relative to the amount of lens movement. There is then the need for fine control over the amount of lens movement, which renders precise focusing difficult.

As the lower limit value of Condition (6) is not reached, it is going to cancel out the zooming action produced on the object side with respect to the fifth lens group; so the zooming groups must have higher refractive indices. Falling short of the lower limit value causes spherical aberrations, coma, field curvature, longitudinal chromatic aberration and chromatic aberration of magnification to go unacceptably worse, rendering it difficult to obtain satisfactory optical performance.

It is more preferable to satisfy the following Condition (6)' instead of Condition (6):

$$0.975 \leq MG_{G5T}/MG_{G5W} \leq 1.25 \qquad (6)'$$

It is even more preferable to satisfy the following Condition (6)" instead of Condition (6):

$$0.985 \leq MG_{G5T}/MG_{G5W} \leq 1.24 \qquad (6)''$$

For the zoom lens according to the embodiment here, it is preferable to satisfy the following Condition (7):

$$-0.5 \leq \Delta L_{G5}/F_W \leq 1 \qquad (7)$$

where $\Delta L_{G5}$ is the difference between the distance from the surface in and on the most image side of the fifth lens group to the image plane at the time when the zoom lens is at the wide-angle end and the distance from the surface in and on the most image side of the fifth lens group to the image plane at the time when the zoom lens is at the telephoto end, and $F_W$ is the focal length of the whole zoom lens optical system at the wide-angle end.

Condition (7) defines the ratio between the difference between the distance from the surface in and on the most image side of the fifth lens group to the image plane at the time when the zoom lens is at the telephoto end and the distance from the surface in and on the most image side of the fifth lens group at the time to the image plane when the zoom lens is at the wide-angle end, and the focal length of the whole zoom lens optical system at the wide-angle end. The satisfaction of Condition (7) enables precise focusing by the fifth lens group.

Exceeding the upper limit value of Condition (7) causes some considerable zooming to take place at the fifth lens group or, in another parlance, the refracting power of the fifth group to grow strong, giving rise to too large a focal position change relative to the amount of lens movement. There is then the need for fine control over the amount of lens movement, which renders precise focusing difficult.

Falling short of the lower limit value of Condition (7) renders it difficult to take up the space for focusing the fifth lens group.

It is more preferable to satisfy the following Condition (7)' instead of Condition (7):

$$-0.3 \leq \Delta L_{G5}/F_W \leq 1 \qquad (7)'$$

It is even more preferable to satisfy the following Condition (7)" instead of Condition (7):

$$-0.1 \leq \Delta L_{G5}/F_W \leq 0.99 \qquad (7)''$$

For the zoom lens of the embodiment here, it is preferable to satisfy the following Condition (8):

$$-0.005 \leq (\Delta L_{G5}/F_W)/M^2 \leq 0.023 \quad (8)$$

where $\Delta L_{G5}$ is the difference between the distance from the surface in and on the most image side of the fifth lens group to the image plane at the time when the zoom lens is at the wide-angle end and the distance from the surface in and on the most image side of the fifth lens group to the image plane at the time when the zoom lens is at the telephoto end, $F_W$ is the focal length of the whole zoom lens optical system at the wide-angle end, and M is the optical magnification of the zoom lens.

Condition (8) defines the ratio between the ratio between the difference between the distance from the surface in and on the most image side of the fifth lens group to the image plane at the time when the zoom lens is at the telephoto end and the distance from the surface in and on the most image side of the fifth lens group to the image plane at the time when the zoom lens is at the wide-angle end and the focal length of the whole zoom lens optical system at the wide-angle end and the square of the optical magnification. The satisfaction of Condition (8) makes precise focusing by the fifth lens group possible.

Exceeding the upper limit value of Condition (8) causes some considerable zooming to take place at the fifth lens group or, in another parlance, the refracting power of the fifth group to grow strong, giving rise to too large a focal position change relative to the amount of lens movement. There is then the need for fine control over the amount of lens movement, which renders precise focusing difficult.

Falling short of the lower limit value of Condition (8) renders it difficult to take up the space for focusing the fifth lens group.

It is more preferable to satisfy the following Condition (8)' instead of Condition (8):

$$-0.003 \leq (\Delta L_{G5}/F_W)/M^2 \leq 0.022 \quad (8)'$$

It is even more preferable to satisfy the following Condition (8)" instead of Condition (8):

$$0 \leq (\Delta L_{G5}/F_W)/M^2 \leq 0.022 \quad (8)''$$

For the zoom lens of the embodiment here, it is preferable to satisfy the following Condition (9):

$$0.15 \leq L_{WG4G5}/L_{TG4G5} 1.7 \quad (9)$$

where $L_{WG4G5}$ is the air separation distance between the fourth lens group and the fifth lens group at the wide-angle end of the zoom lens, and $L_{TG4G5}$ is the air separation distance between the fourth lens group and the fifth lens group at the telephoto end of the zoom lens.

Condition (9) defines the ratio between the air separation end between the fourth lens group and the fifth lens group at the wide-angle end of the zoom lens and the air separation distance between the fourth lens group and the fifth lens group at the telephoto end of the zoom lens. By the satisfaction of Condition (9), it is possible to obtain a zoom lens optical system that is capable of precise focusing by the fifth lens group and has a curtailed full length.

Exceeding the upper limit value of Condition (9) causes the zooming effect of the fifth lens group to increase, giving rise to a larger focal position change relative to the amount of lens movement or, in another parlance, it causes the refracting power of the fifth lens group to grow strong. There is then the need for fine control over the amount of movement, which renders precise focusing difficult.

Falling short of the lower limit value of Condition (9) causes the air separation between the fourth lens group and the fifth lens group to grow wide at the telephoto end. As this happens with a zoom lens optical system having a curtailed full length, the separation between the fifth lens group and the sixth lens group becomes too narrow to take up the space necessary for focusing.

It is more preferable to satisfy the following Condition (9)' instead of Condition (9):

$$0.15 \leq L_{WG4G5}/L_{TG4G5} \leq 1.5 \quad (9)'$$

It is even more preferable to satisfy the following Condition (9)" instead of Condition (9):

$$0.135 \leq L_{WG4G5}/L_{TG4G5} \leq 1.4 \quad (9)''$$

For the zoom lens of the embodiment here, it is preferable to satisfy the following Condition (10):

$$0.3 \leq L_{WG5G6}/L_{TG5G6} \leq 1.8 \quad (10)$$

where $L_{WG5G6}$ is the air separation distance between the fifth lens group and the sixth lens group at the wide-angle end of the zoom lens, and $L_{TG5G6}$ is the air separation distance between the fifth lens group and the sixth lens group at the telephoto end of the zoom lens.

Condition (10) defines the ratio between the air separation distance between the fifth lens group and the sixth lens group at the wide-angle end of the zoom lens and the air separation distance between the firth lens group and the sixth lens group at the telephoto end of the zoom lens. By the satisfaction of Condition (10), it is possible to obtain a zoom lens optical system that is capable of precise focusing by the fifth lens group and has a curtailed full length.

As the upper limit value of Condition (10) is exceeded, it causes the air separation between the fifth lens group and the sixth lens group to become too narrow at the telephoto end to take up the space necessary for focusing.

As the lower limit value of Condition (10) is not reached, it causes the zooming effect of the fifth lens group to increase or, in another parlance, it causes the refracting power of the fifth lens group to grow strong, giving rise to too large a focal position change relative to the amount of lens movement. There is then the need for fine control over the amount of movement, which renders precise focusing difficult.

For the zoom lens of the embodiment here, it is preferable that the surface in and on the most image side of the fourth lens group is concave on its image side.

The arrangement as mentioned above enables the front principal point of the fourth lens group to be positioned more on the objet side so that the zooming space is more effectively used than could be achieved in the prior art. It is thus possible to obtain a small-format zoom lens that can take hold of a sufficient zoom ratio while the zooming space is kept small.

It is then preferable that the diverging surface defined by the surface in and on the most image side of the fourth lens group is the most divergent ever in that group. This in turn enables the front principal point of the fourth lens group to be positioned more on the object side, resulting in the ability to obtain a zoom lens of smaller size.

For the zoom lens of the embodiment here, it is preferable that the fifth lens group moves in a convex orbit toward the image side upon zooming from the wide-angle end to the telephoto end.

With the arrangement as described above, it is possible to obtain a zoom lens optical system that is capable of precise focusing by the fifth lens group, and has a curtailed full length.

For the zoom lens of the embodiment here, it is preferable that upon zooming from the wide-angle end to the telephoto end, the separation between the first lens group and the second lens group grows wide, the separation between the second lens group and the third lens group gets narrow, the separation between the third lens group and the fourth lens group gets narrow, the separation between the fourth lens group and the fifth lens group changes, and the separation between the fifth lens group and the sixth lens group changes.

With the arrangement as described above, it is possible to implement efficient focusing and achieve size reduction.

For the zoom lens of the embodiment here, it is preferable that the surface in and on the most object side of the fifth lens group is concave on its object side.

With the arrangement as described above, it is possible to hold back field curvature, astigmatism and chromatic aberration of magnification satisfactorily all over the area from the wide-angle end to the telephoto end.

For the zoom lens of the embodiment here, it is preferable to satisfy the following Condition (15):

$$-0.2 \leq (R_{G5S}+R_{G5L})/(R_{G5L}-R_{G5S}) \leq 8 \tag{15}$$

where $R_{G5S}$ is the radius of curvature of the surface in and on the most object side of the fifth lens group in the zoom lens, and $R_{G5L}$ is the radius of curvature of the surface in and on the most image side of the fifth lens group in the zoom lens.

In Condition (15), the shape of the fifth lens group is defined in terms of a numerical formula. By the satisfaction of Condition (15), it is possible to hold back field curvature, astigmatism and chromatic aberration of magnification satisfactorily all over the area from the wide-angle end to the telephoto end.

As the upper limit value of Condition (15) is exceeded, it causes field curvature to remain under and higher-order chromatic aberration of magnification to go worse all over the area from the wide-angle end to the telephoto end, rendering it difficult to obtain satisfactory optical performance.

As the lower limit value of Condition (15) is not reached, it causes field curvature to remain under and higher-order chromatic aberration of magnification to go worse all over the area from the wide-angle end to the telephoto end, rendering it difficult to obtain satisfactory optical performance.

It is more preferable to satisfy the following Condition (15)' instead of Condition (15):

$$-0.2 \leq (R_{G5S}+R_{G5L})/(R_{G5L}-R_{G5S}) \leq 5 \tag{15}'$$

It is even more preferable to satisfy the following Condition (15)" instead of Condition (15):

$$-0.18 \leq (R_{G5S}+R_{G5L})/(R_{G5L}-R_{G5S}) \leq 3.5 \tag{15}"$$

For the zoom lens of the embodiment here, it is preferable to satisfy the following Condition (11):

$$1.1 \leq F_{G5}/F_{G4Ln} \leq 5 \tag{11}$$

where $F_{G5}$ is the focal length of the fifth lens group in the zoom lens, and $F_{G4Ln}$ is the focal length of the negative lens in and on the most image side of the fourth lens group in the zoom lens.

Condition (11) defines the ratio between the focal length of the fifth lens group in the zoom lens and the focal length of the negative lens in and on the image side of the fourth lens group. By the satisfaction of Condition (11), it is possible to obtain a small-format zoom lens that has satisfactory optical performance.

Exceeding the upper limit value of Condition (11) undermines the ability of the movement of the fifth lens group to correct aberrations, rendering it difficult to correct especially coma and astigmatism all over the area from the wide-angle end to the telephoto end. It is thus very difficult to obtain a zoom lens having satisfactory optical performance. It also gives rise to an increase in the amount of movement of the fifth lens group upon focusing, working against a curtailing of full length.

As the lower limit value of Condition (11) is not reached, it causes aberration fluctuations resulting from the movement of the fifth lens group to grow too large to correct especially coma and astigmatism all over the area from the wide-angle end to the telephoto end, rendering it very difficult to obtain a zoom lens having satisfactory optical performance. It also causes the focal position change to grow too large relative to the amount of movement of the fifth lens group; so there is the need for fine control over the amount of movement, which renders it difficult to implement precise focusing.

It is more preferable to satisfy the following Condition (11)' instead of Condition (11):

$$1.2 \leq F_{G5}/F_{G4Ln} \leq 4.5 \tag{11}'$$

It is even more preferable to satisfy the following Condition (11)" instead of Condition (11):

$$1.2 \leq F_{G5}/F_{G4Ln} \leq 4.0 \tag{11}"$$

For the zoom lens of the embodiment here, it is preferable to satisfy the following Condition (12):

$$0.1 \leq (R_{G5S}+R_{G4L})/(R_{G5S}-R_{G4L}) \leq 0.9 \tag{12}$$

where $R_{G5S}$ is the radius of curvature of the surface in and on the most object side of the fifth lens group, and $R_{G4L}$ is the radius of curvature of the surface in and on the most image side of the fourth lens group.

In Condition (12), the shape of the air lens formed by the surface in and on the most image side of the fourth lens group and the surface in and on the most object side of the fifth lens group in the zoom lens is defined in terms of a numerical formula. By the satisfaction of Condition (12), it is possible to correct field curvature, astigmatism and chromatic aberration satisfactorily all over the area from the wide-angle end to the telephoto end.

As the upper limit value of Condition (12) is exceeded, it causes meridional field curvature to remain under, producing high-order chromatic aberration of magnification from the wide-angle end to an intermediate setting and producing astigmatism at the telephoto end; so it is difficult to make sure satisfactory optical performance.

As the lower limit value of Condition (12) is not reached, it causes field curvature in particular to remain over all over the area from the wide-angle end to the telephoto end; so it is difficult to make sure satisfactory optical performance.

It is more preferable to satisfy the following Condition (12)' instead of Condition (12):

$$0.2 \leq (R_{G5S}+R_{G4L})/(R_{G5S}-R_{G4L}) \leq 0.8 \tag{12}'$$

It is even more preferable to satisfy the following Condition (12)" instead of Condition (12):

$$0.3 \leq (R_{G5S}+R_{G4L})/(R_{G5S}-R_{G4L}) \leq 0.7 \tag{12}"$$

For the zoom lens of the embodiment here, it is preferable that the sixth lens group remains fixed during zooming.

With the arrangement as described above, it is possible to reduce the number of lens groups that keep moving during zooming thereby simplifying the construction of an associated lens barrel. It is thus possible to make the whole imaging apparatus smaller.

For the zoom lens of the embodiment here, it is preferable to satisfy the following Condition (13):

$$1.9 \leq |(R_{G4L}+R_{G4S})/(R_{G4L}-R_{G4S})| \qquad (13)$$

where $R_{G4S}$ is the radius of curvature of the surface in and on the most object side of the fourth lens group, and $R_{G4L}$ is the radius of curvature of the surface in and on the most image side of the fourth lens group.

In Condition (13), the whole shape of the fourth lens group in the zoom lens is defined in terms of a numerical formula. By the satisfaction of Condition (13), it is possible to offer a proper balance between the converging and diverging surfaces in the fourth lens group thereby correcting spherical aberrations, coma, field curvature and chromatic aberrations satisfactorily all over the area from the wide-angle end to the telephoto end.

As the lower limit value of Condition (13) is not reached, it renders it very difficult to balance the converging surface against the diverging surface, getting rid of the ability to correct aberrations; so it is difficult to make sure satisfactory optical performance by reason of the occurrence of spherical aberrations, coma, field curvature and chromatic aberrations in particular.

For the zoom lens of the embodiment here, it is preferable that the second lens group includes at least two negative lenses located back-to-back and side-by-side.

With the arrangement as described above, the front principal point of the second lens group is positioned more on the object side, leading to efficient zooming by the second lens group that is the zooming group. It is thus possible to achieve a small-format zoom lens. Especially if the distance from the surface in and on the most object side of the second lens group to the entrance pupil is curtailed, size reduction may then be achievable while the angle of view is kept wide.

With the instant embodiment as described above, the bending optical system including a reflective optical element can be used to provide a small-format zoom lens well corrected for aberrations as well as an electronic imaging apparatus incorporating the same.

It is here to be noted that only the upper or lower limit value of each condition may be replaced by a new upper or lower limit value.

While specific examples of the inventive zoom lens and electronic imaging apparatus are now explained at great length with reference to the accompanying drawings, it is to be understood that the invention is never limited to them.

The imaging optical system or zoom lens according to Example 1 is now explained. FIG. 1 is a sectional view, as taken along the optical axis, of the optical construction of the zoom lens according to Example 1 (a) at the wide-angle end, (b) in the intermediate focal length setting, and (c) at the telephoto end, respectively.

As shown in FIG. 1, the imaging optical system or zoom lens according to Example 1 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power. Commonly to all the examples, P, CG and I in the lens sectional views are indicative of a prism, a cover glass and the image plane of an electronic imaging device, respectively.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lens L12 and double-convex positive lens L13 cooperate together to form a rear subgroup G1b having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a double-convex positive lens L42 and a double-concave negative lens L43, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the image side with a narrowing of the separation between it and the sixth lens group G6 from the wide-angle end to the intermediate setting, and moves toward the object side with a widening of the separation between it and the sixth lens group G6 from the intermediate setting to the telephoto end.

Six aspheric surfaces are applied: one to the image-side surface r2 of the negative meniscus lens L11 in the first lens group G1, one to the image-side surface r10 of the double-concave negative lens L21 in the second lens group G2, one to the object-side surface r15 of the positive meniscus lens L31 in the third lens group G3, one to the object-side surface r17 of the double-convex positive lens L41 in the fourth lens group G4, one to the image-side surface r21 of the double-concave negative lens L43 forming a part of the cemented lens SU41 in the fourth lens group G4, and one to the image-side surface r25 of the double-convex positive lens L61 forming the sixth lens group G6.

The imaging optical system or zoom lens according to Example 2 is now explained. FIG. 2 is a sectional view, as taken along the optical axis, of the optical construction of the zoom lens according to Example 2 (a) at the wide-angle end, (b) in the intermediate focal length setting, and (c) at the telephoto end, respectively.

As shown in FIG. 2, the imaging optical system or zoom lens according to Example 2 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lens L12 and double-convex positive lens L13 here cooperate together to form a rear subgroup G1b having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a negative meniscus lens L42 convex on its object side, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the image side with a narrowing of the separation between it and the sixth lens group G6 from the wide-angle end to the intermediate setting, and moves toward the object side with a widening of the separation between it and the sixth lens group G6 from the intermediate setting to the telephoto end.

Five aspheric surfaces are applied: one to the image-side surface r2 of the negative meniscus lens L11 in the first lens group G1, one to the image-side surface r10 of the double-concave negative lens L2 in the second lens group G2, one to the object-side surface r15 of the positive meniscus lens L31 in the third lens group G3, one to the object-side surface r17 of the double-convex positive lens L41 in the fourth lens group G4, and one to the image-side surface r20 of the negative meniscus lens L42 in the fourth lens group G4.

Figure 3:
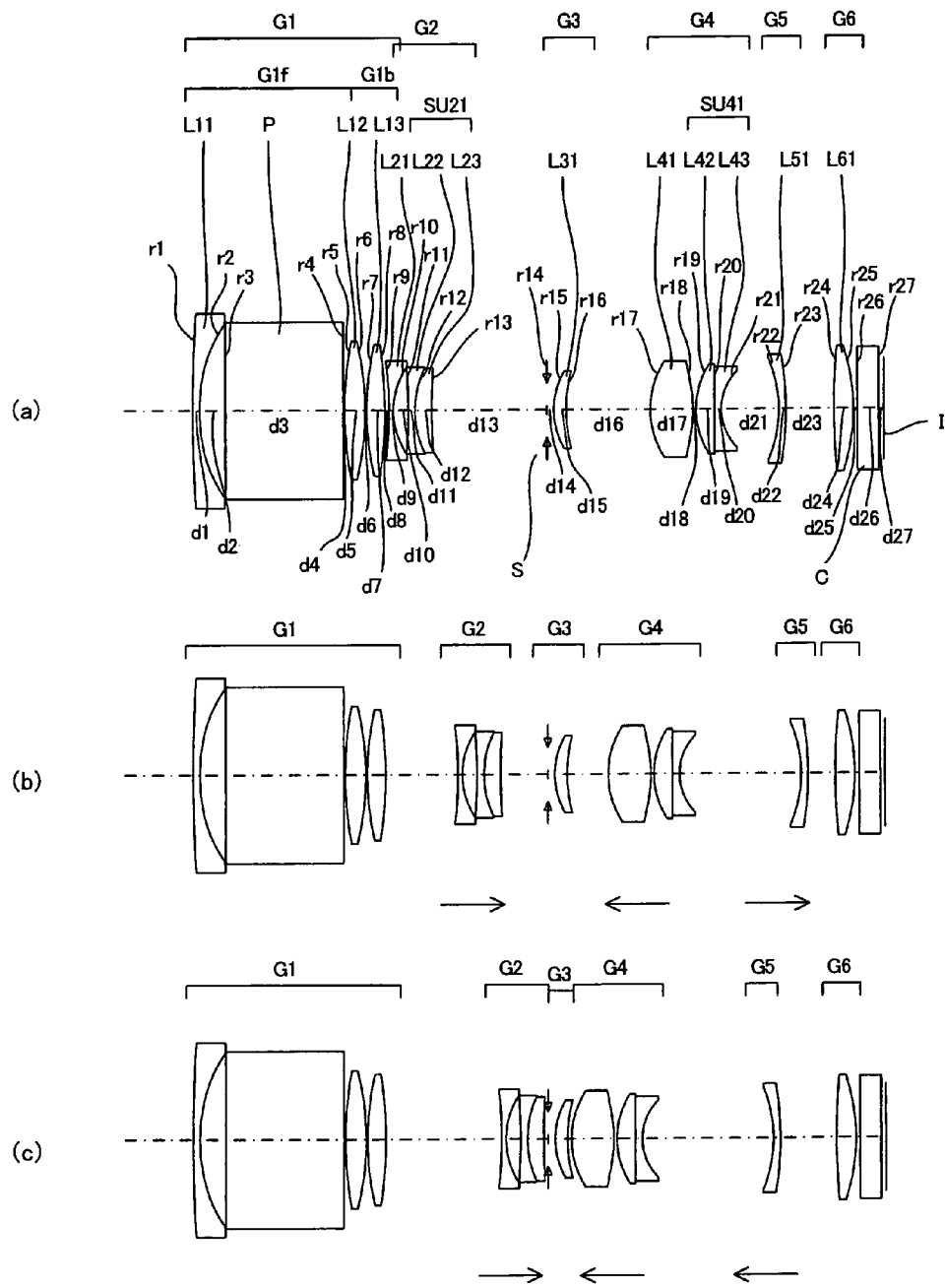
FIG. 3 is a sectional view, as taken along the optical axis, of the optical arrangements of the zoom lens according to Example 3 upon focusing on an infinite object (a) at the wide-angle end, (b) in an intermediate setting, and (c) at the telephoto end.

The imaging optical system or zoom lens according to Example 3 is now explained. FIG. 3 is a sectional view, as taken along the optical axis, of the optical construction of the zoom lens according to Example 3 (a) at the wide-angle end, (b) in the intermediate focal length setting, and (c) at the telephoto end, respectively.

As shown in FIG. 3, the imaging optical system or zoom lens according to Example 3 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P cooperate together to form a front subgroup G1f having negative refracting power, and the double-convex positive lens L12 and double-convex positive lens L13 here cooperate together to form a rear subgroup G1b having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a positive meniscus lens L42 convex on its object side and a negative meniscus lens L43 convex on its object side, and has positive refracting power throughout.

The fifth lens group G5 is made up of a negative meniscus lens L51 convex on its image side, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the intermediate setting, and moves toward the object side with a widening of the separation between it and the sixth lens group G6.

Five aspheric surfaces are applied: one to the image-side surface r12 of the negative meniscus lens L11 in the first lens group G1, one to the object-side surface r15 of the positive meniscus lens L31 in the third lens group G3, and two to both surfaces r17 and r18 of the double-convex positive lens L41 in the fourth lens group G4.

Figure 4:
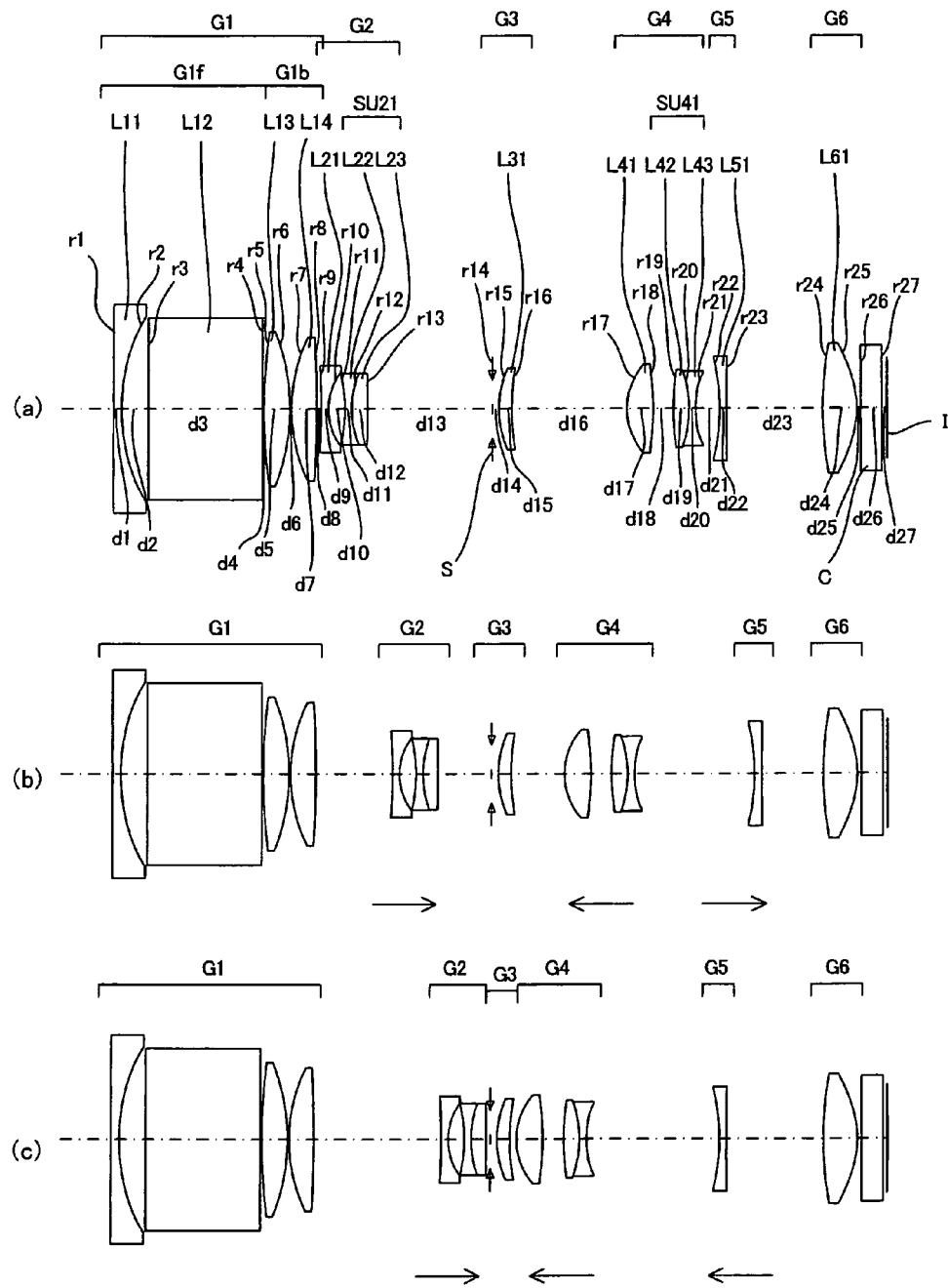
FIG. 4 is a sectional view, as taken along the optical axis, of the optical arrangements of the zoom lens according to Example 4 upon focusing on an infinite object (a) at the wide-angle end, (b) in an intermediate setting, and (c) at the telephoto end.
Figure 7:
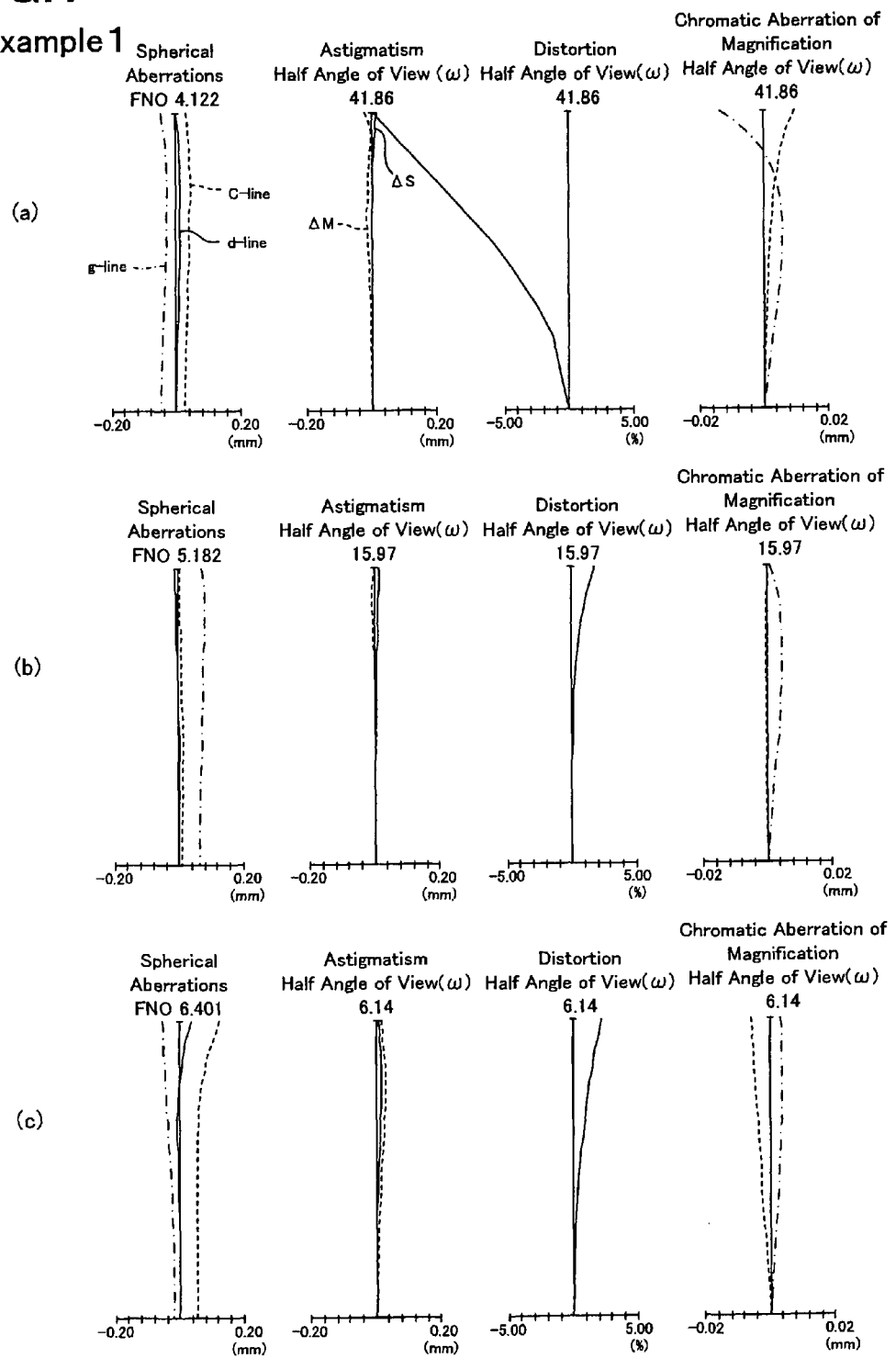
FIG. 7 is a set of aberration diagrams (a) at the wide-angle end, (b) in an intermediate setting and (c) at the telephoto end for spherical aberrations, astigmatism, distortion and chromatic aberration of magnification of the imaging optical system according to Example 1 upon focusing on an infinite object.
Figure 8:
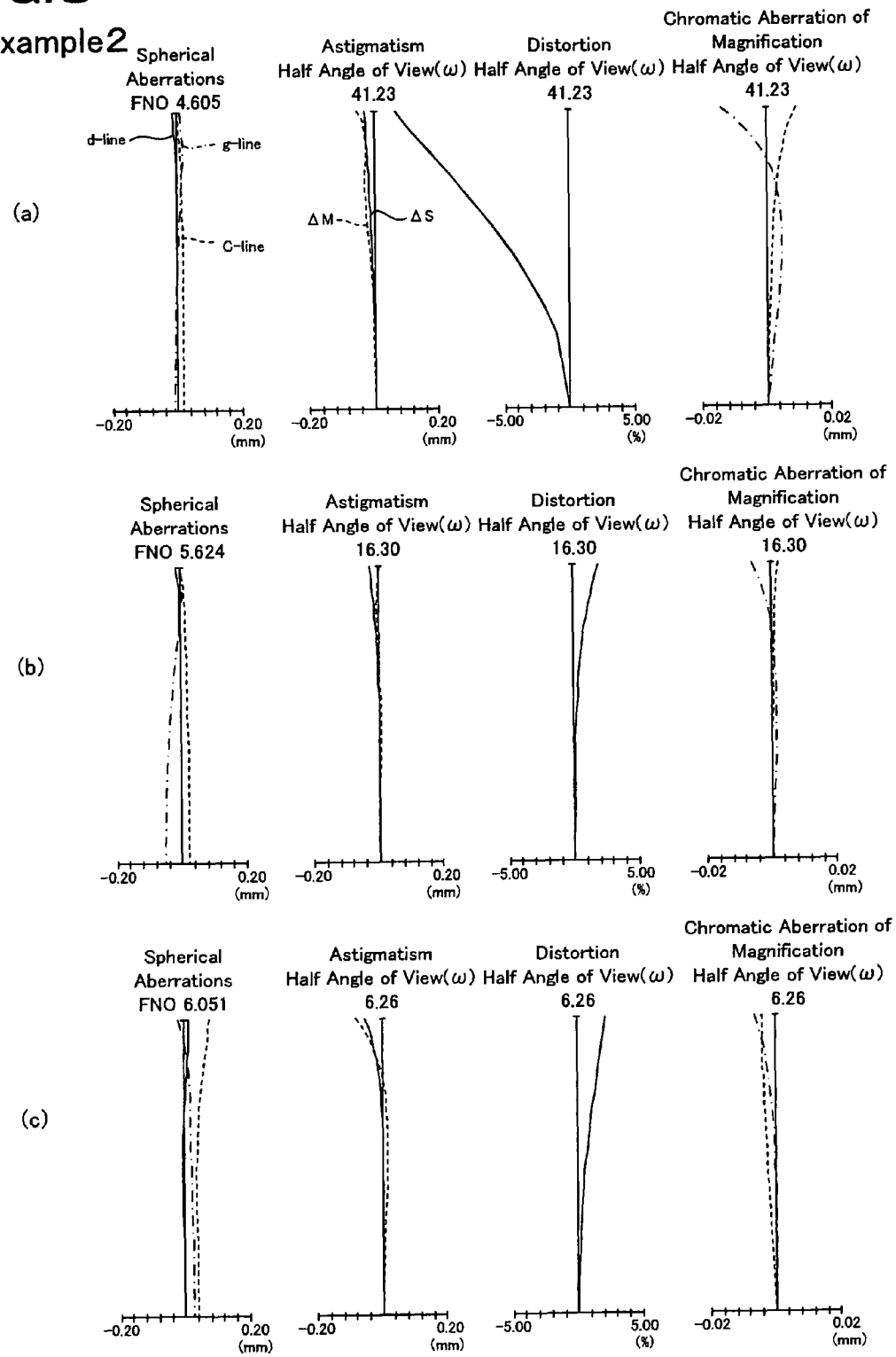
FIG. 8 is a set of aberration diagrams (a) at the wide-angle end, (b) in an intermediate setting and (c) at the telephoto end for spherical aberrations, astigmatism, distortion and chromatic aberration of magnification of the imaging optical system according to Example 2 upon focusing on an infinite object.
Figure 9:
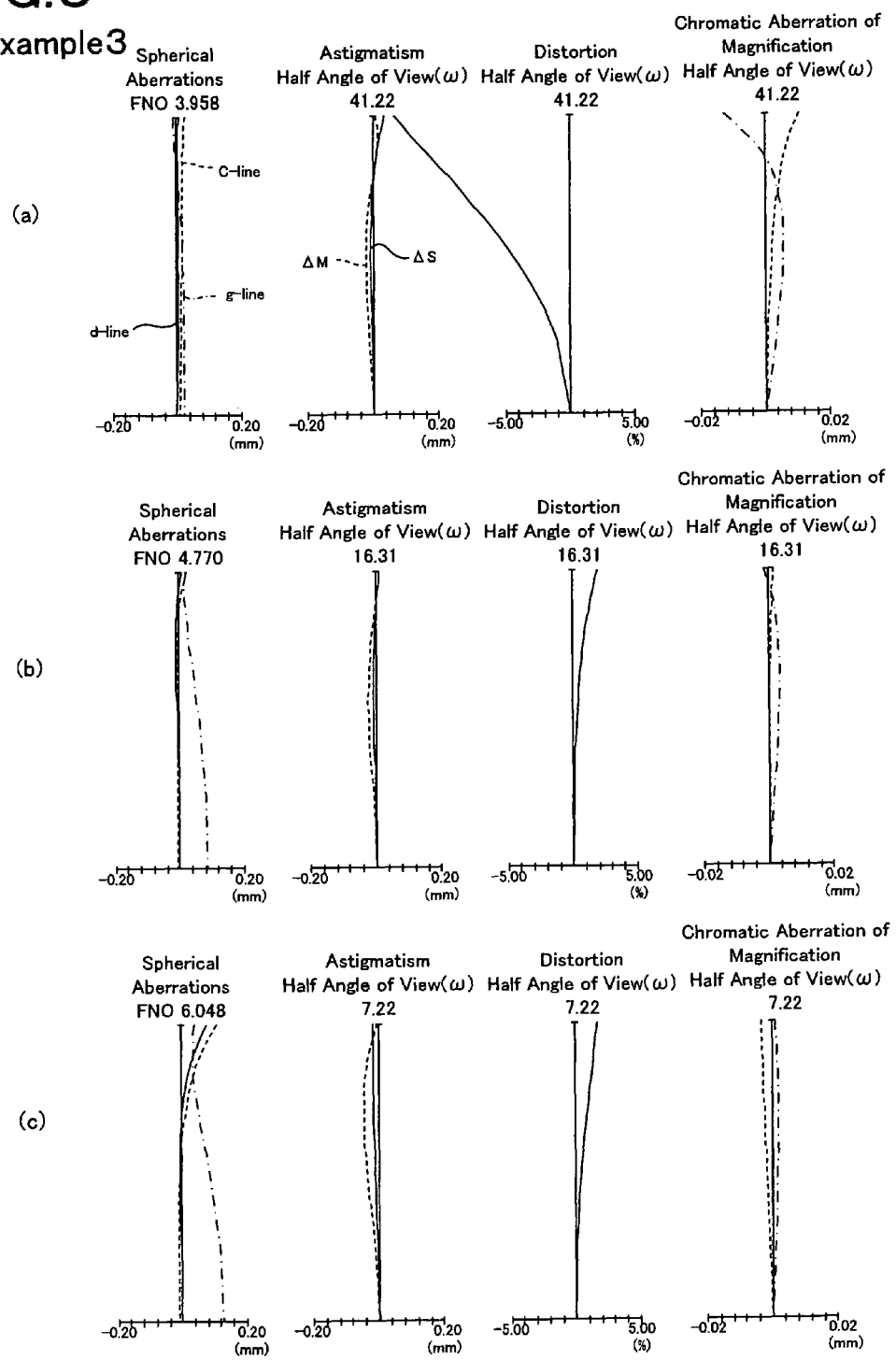
FIG. 9 is a set of aberration diagrams (a) at the wide-angle end, (b) in an intermediate setting and (c) at the telephoto end for spherical aberrations, astigmatism, distortion and chromatic aberration of magnification of the imaging optical system according to Example 3 upon focusing on an infinite object.
Figure 10:
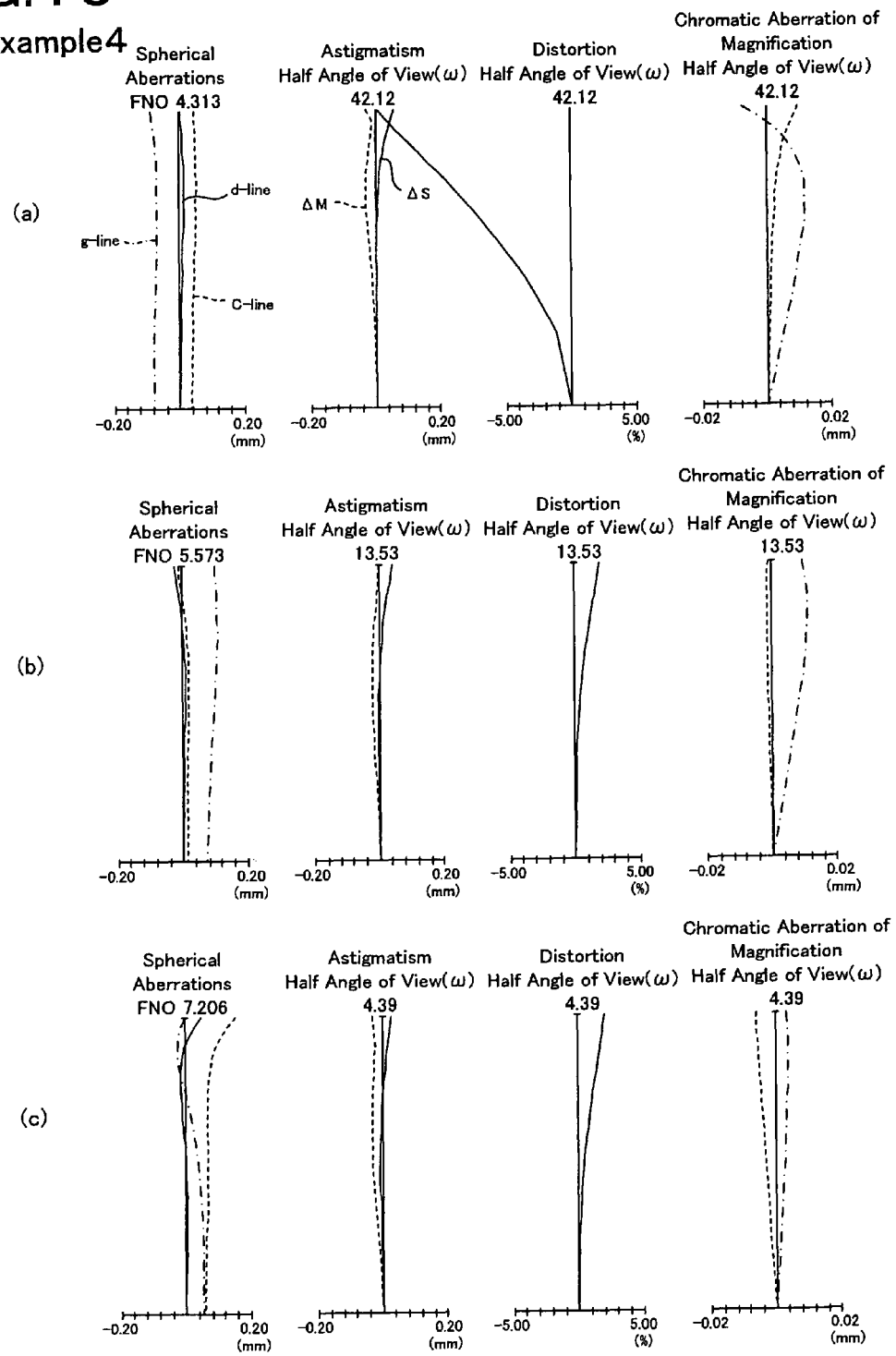
FIG. 10 is a set of aberration diagrams (a) at the wide-angle end, (b) in an intermediate setting and (c) at the telephoto end for spherical aberrations, astigmatism, distortion and chromatic aberration of magnification of the imaging optical system according to Example 4 upon focusing on an infinite object.
Figure 11:
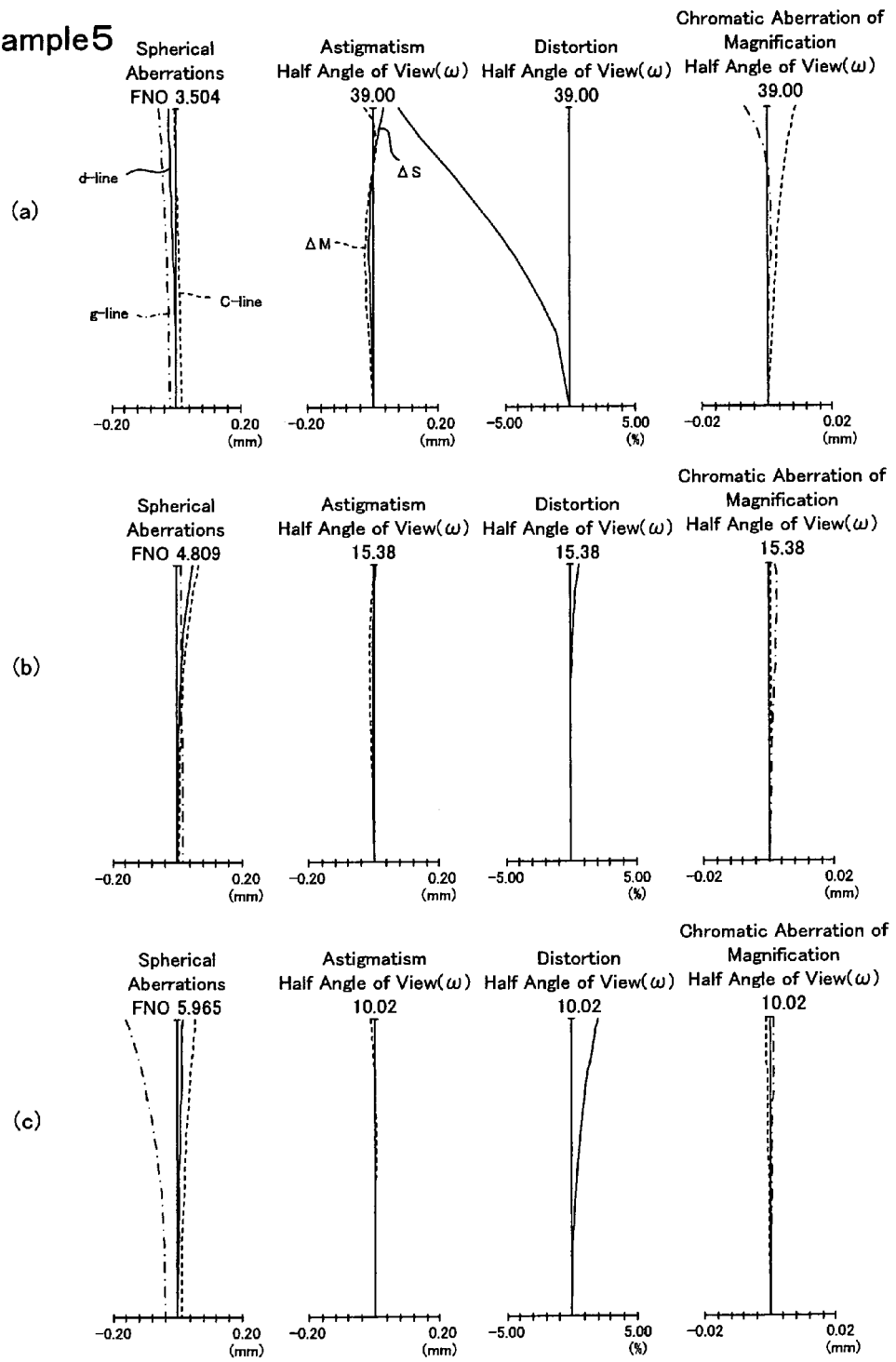
FIG. 11 is a set of aberration diagrams (a) at the wide-angle end, (b) in an intermediate setting and (c) at the telephoto end for spherical aberrations, astigmatism, distortion and chromatic aberration of magnification of the imaging optical system according to Example 5 upon focusing on an infinite object.
Figure 12:
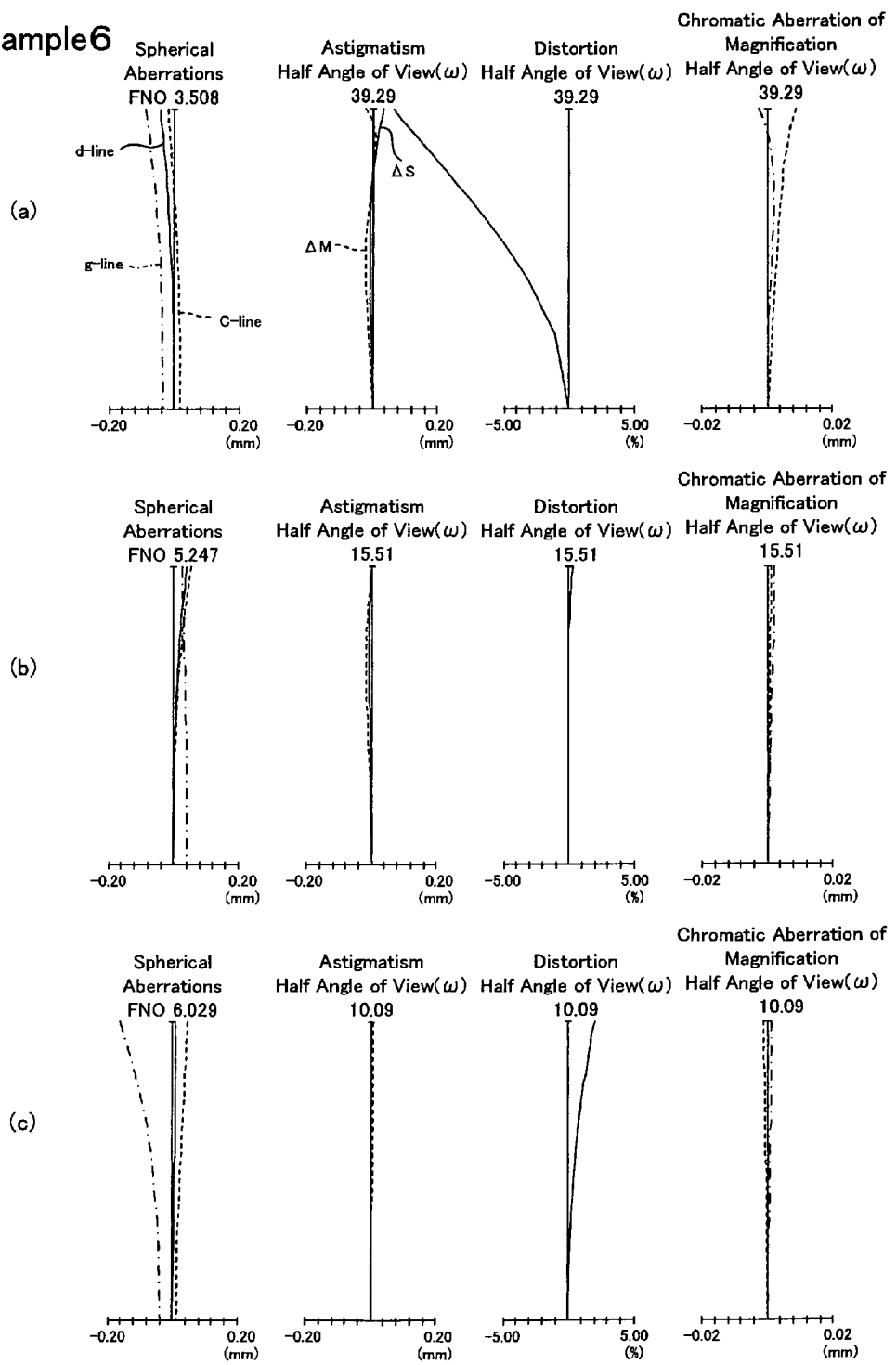
FIG. 12 is a set of aberration diagrams (a) at the wide-angle end, (b) in an intermediate setting and (c) at the telephoto end for spherical aberrations, astigmatism, distortion and chromatic aberration of magnification of the imaging optical system according to Example 6 upon focusing on an infinite object.

The imaging optical system or zoom lens according to Example 4 is now explained. FIG. 4 is a sectional view, as taken along the optical axis, of the optical construction of the zoom lens according to Example 4 (a) at the wide-angle end, (b) in the intermediate focal length setting, and (c) at the telephoto end, respectively.

As shown in FIG. 4, the imaging optical system or zoom lens according to Example 4 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a plano-concave negative lens L11 concave on its image side, the prism P that is the reflective optical element, a double-convex positive lens L12 and a double-convex positive lens L13, and has positive refracting power throughout. The plano-concave lens negative lens L11 and prism P here cooperate together to form a front subgroup G1f having negative refracting power, and the double-convex positive lenses L12 and L13 here cooperate together to form a front subgroup G1b having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a double-convex positive lens L42 and a double-concave negative lens L43, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a narrowing of the separation between it and the sixth lens group G6 from the wide-angle end to the intermediate setting, and moves toward the object side with a widening of the separation between it and the sixth lens group G6 from the intermediate setting to the telephoto end.

Seven aspheric surfaces are applied: one to the image-side surface r2 of the plano-concave negative lens L11 in the first lens group G1, one to the image-side surface r10 of the double-concave negative lens L21 in the second lens group G2, one to the object-side surface r15 of the positive meniscus lens L31 in the third lens group G3, two to both surfaces r17 and 18 of the double-convex positive lens L41 in the fourth lens group G4, one to the image-side surface r21 of the double-concave negative lens L43 forming a part of the cemented lens SU41 in the fourth lens group G4, and one to the image-side surface r25 of the double-convex positive lens L61 in the sixth lens group G6.

The imaging optical system or zoom lens according to Example 5 is now explained. FIG. 5 is a sectional view, as taken along the optical axis, of the optical construction of the zoom lens according to Example 5 (a) at the wide-angle end, (b) in the intermediate focal length setting, and (c) at the telephoto end, respectively.

As shown in FIG. 5, the imaging optical system or zoom lens according to Example 5 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22 and a positive meniscus lens L23 convex on its object side, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a plano-convex positive lens L42 convex on its object side and a plano-concave negative L43 concave on its image side, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Four aspheric surfaces are applied: one to the image-side surface r2 of the negative meniscus lens L11 in the first lens group G1, one to the object-side surface r15 of the positive meniscus lens L31 in the third lens group G3, one to the object-side surface r19 of the plano-convex positive lens L41 forming a part of the cemented lens SU41, and one to the image-side surface r21 of the plano-concave negative lens L41 forming a part of the cemented lens SU41.

The imaging optical system or zoom lens according to Example 6 is now explained. FIG. 6 is a sectional view, as taken along the optical axis, of the optical construction of the zoom lens according to Example 6 (a) at the wide-angle end, (b) in the intermediate focal length setting, and (c) at the telephoto end, respectively.

As shown in FIG. 6, the imaging optical system or zoom lens according to Example 6 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22 and a positive meniscus lens L23 convex on its object side, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a plano-convex positive lens L42 convex on its object side and a plano-concave negative lens L43 concave on its image side, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Four aspheric surfaces are applied: one to the image-side surface r2 of the negative meniscus lens L11 in the first lens group G1, one to the object-side surface r15 of the positive meniscus lens L31 in the third lens group G3, one to the object-side surface r19 of the plano-convex positive lens L41 forming a part of the cemented lens SU41 in the fourth lens group G4, and one to the image-side surface r21 of the plano-concave negative lens L42 forming a part of the cemented lens SU41 in the fourth lens group G4.

Tabulated below are the numeral data on the optical components forming the imaging optical systems or zoom lenses of Examples 1 to 6. In the numeral data in the respective examples, r1, r2, . . . are the radii of curvatures of the respective lens surfaces; d1, d2, . . . are the thicknesses or air separations of the respective lenses; nd1, nd2, . . . are the d-line ($\lambda$=587.56 nm) refractive indices of the respective lenses; vd1, vd2, . . . are the d-line ($\lambda$=587.56 nm) Abbe constants of the respective lenses; Fno. is the F-number; and $\omega$ is the half angle of view (°). The "stop" referred to means an apertures stop.

Here let z be the optical axis direction, y be the direction orthogonal to the optical axis, K be the conic coefficient, and A4, A6, A8 and A10 be the aspheric coefficients. Aspheric shape is then given by the following formula (I):

$$z=(y^2/r)/[1+\{1-(1+K)(y/r)^2\}^{1/2}]+A4y^4+A6y^6+A8y^8+A10y^{10} \quad (I)$$

It is here to be noted that E stands for a power of 10, and that the symbols of these values are common to the numeral data on the examples, given later.

Numeral Example 1

| | | Unit mm | | |
|---|---|---|---|---|
| | | Surface Data | | |
| Surface No. | r | d | nd | vd |
| 1 | 104.846 | 0.60 | 1.82115 | 24.06 |
| 2 (Aspheric Surface) | 12.929 | 1.90 | | |
| 3 | ∞ | 8.40 | 1.88300 | 40.76 |
| 4 | ∞ | 0.10 | | |
| 5 | 166.189 | 1.48 | 1.49700 | 81.61 |
| 6 | −14.594 | 0.10 | | |
| 7 | 13.802 | 1.63 | 1.64000 | 60.08 |
| 8 | −32.350 | D8 | | |
| 9 | −24.439 | 0.50 | 1.80610 | 40.92 |
| 10 (Aspheric Surface) | 4.900 | 1.20 | | |
| 11 | −13.172 | 0.50 | 1.77250 | 49.60 |
| 12 | 8.464 | 1.07 | 1.92286 | 18.90 |
| 13 | −180.485 | D13 | | |
| 14 (Stop) | ∞ | 0.50 | | |
| 15 (Aspheric Surface) | 6.794 | 0.94 | 1.69350 | 53.21 |
| 16 | 15.121 | D16 | | |
| 17 (Aspheric Surface) | 4.658 | 1.82 | 1.49700 | 81.61 |
| 18 | −16.502 | 1.06 | | |
| 19 | 12.737 | 1.13 | 1.59270 | 35.31 |
| 20 | −12.769 | 0.50 | 1.82115 | 24.06 |
| 21 (Aspheric Surface) | 5.889 | D21 | | |
| 22 | −13.689 | 0.50 | 1.88300 | 40.80 |
| 23 | 38.683 | D23 | | |
| 24 | 12.178 | 2.75 | 1.52542 | 55.78 |
| 25 (Aspheric Surface) | −7.338 | 0.30 | | |
| 26 | ∞ | 1.55 | 1.51633 | 64.14 |
| 27 | ∞ | 0.34 | | |
| Image Plane | ∞ | | | |

Aspheric Data

2nd Surface

K = 0.487, A4 = 1.24587E−04

10th Surface

K = 0.000, A4 = −8.51761E−04, A6 = −1.93183E−05

15th Surface

K = −1.001, A4 = 2.68004E−05

17th Surface

K = −0.300, A4 = −2.65386E−04, A6 = −1.10160E−05,
A8 = −9.76481E−07

21th Surface

K = 0.000, A4 = 2.95596E−03, A6 = 1.42760E−04,
A8 = 1.01377E−05, A10 = −3.45914E−07

25th Surface

K = 0.000, A4 = 9.47414E−04, A6 = −1.34041E−05, A8 = 3.29870E−07,
A10 = −1.03360E−09

| Zoom Data | | | |
|---|---|---|---|
| Zoom Ratio 6.93 | | | |
| | Wide-Angle | Intermediate | Telephoto |
| Focal Length | 5.04 | 13.18 | 34.95 |
| FNO. | 4.12 | 5.18 | 6.40 |
| Angle of View (2$\omega$) | 83.72 | 31.94 | 12.28 |
| Image Hight | 3.84 | 3.84 | 3.84 |
| Full Lens Length | 49.73 | 49.73 | 49.73 |
| BF (in air) | 1.67 | 1.67 | 1.64 |
| D8 | 0.32 | 4.47 | 7.71 |
| D13 | 7.69 | 3.54 | 0.30 |
| D16 | 6.40 | 2.88 | 0.50 |
| D21 | 3.79 | 8.42 | 8.96 |
| D23 | 3.20 | 2.10 | 3.95 |

Numeral Example 2

Unit mm

Surface Data

| Surface No. | r | d | nd | νd |
|---|---|---|---|---|
| 1 | 100.000 | 0.60 | 1.84666 | 23.78 |
| 2 (Aspheric Surface) | 12.773 | 1.90 | | |
| 3 | ∞ | 8.50 | 1.88300 | 40.76 |
| 4 | ∞ | 0.10 | | |
| 5 | 47.513 | 1.59 | 1.49700 | 81.61 |
| 6 | −15.875 | 0.10 | | |
| 7 | 14.242 | 1.55 | 1.65160 | 58.55 |
| 8 | −43.375 | D8 | | |
| 9 | −34.073 | 0.30 | 1.80610 | 40.92 |
| 10 (Aspheric Surface) | 5.225 | 1.27 | | |
| 11 | −11.529 | 0.50 | 1.77250 | 49.60 |
| 12 | 9.772 | 1.08 | 1.92286 | 18.90 |
| 13 | −59.500 | D13 | | |
| 14 (Stop) | ∞ | 0.50 | | |
| 15 (Aspheric Surface) | 7.877 | 0.83 | 1.74320 | 49.34 |
| 16 | 15.992 | D16 | | |
| 17 (Aspheric Surface) | 4.468 | 3.50 | 1.49700 | 81.61 |
| 18 | −12.269 | 0.10 | | |
| 19 | 12.491 | 0.50 | 1.84666 | 23.78 |
| 20 (Aspheric Surface) | 4.991 | D20 | | |
| 21 | −26.168 | 0.50 | 1.84666 | 23.78 |
| 22 | 20.050 | D22 | | |
| 23 | 11.138 | 2.59 | 1.52542 | 55.78 |
| 24 | −12.189 | 0.30 | | |
| 25 | ∞ | 1.55 | 1.51633 | 64.14 |
| 26 | ∞ | 0.34 | | |
| Image Plane | ∞ | | | |

Aspheric Data

2nd Surface

K = 0.238, A4 = 9.12122E−05

10th Surface

K = 0.000, A4 = −5.55094E−04, A6 = −4.10307E−06

15th Surface

K = 0.000, A4 = −1.96098E−04

17th Surface

K = −0.714, A4 = 5.59580E−04, A6 = −7.37981E−06

20th Surface

K = 0.000, A4 = 2.64723E−03, A6 = 1.30494E−04, A8 = 2.02589E−05

Zoom Data
Zoom Ratio 6.76

| | Wide-Angle | Intermediate | Telephoto |
|---|---|---|---|
| Focal Length | 5.07 | 12.88 | 34.27 |
| FNO. | 4.60 | 5.62 | 6.05 |
| Angle of View (2ω) | 82.46 | 32.60 | 12.52 |
| Image Hight | 3.84 | 3.84 | 3.84 |
| Full Lens Length | 49.73 | 49.74 | 49.73 |
| BF (in air) | 1.67 | 1.68 | 1.67 |
| D8 | 0.31 | 4.71 | 8.71 |
| D13 | 8.69 | 4.28 | 0.30 |
| D16 | 4.36 | 1.42 | 0.44 |
| D20 | 5.30 | 8.66 | 4.22 |
| D22 | 3.39 | 2.98 | 8.39 |

Numeral Example 3

Unit mm

Surface Data

| Surface No. | r | d | nd | νd |
|---|---|---|---|---|
| 1 | 113.965 | 0.50 | 1.82115 | 24.06 |
| 2 (Aspheric Surface) | 13.561 | 1.90 | | |
| 3 | ∞ | 8.50 | 1.88300 | 40.76 |
| 4 | ∞ | 0.10 | | |
| 5 | 28.210 | 1.50 | 1.49700 | 81.61 |
| 6 | −21.607 | 0.10 | | |
| 7 | 21.753 | 1.33 | 1.69680 | 55.53 |
| 8 | −33.615 | D8 | | |
| 9 | −29.517 | 0.30 | 1.80610 | 40.92 |
| 10 (Aspheric Surface) | 5.594 | 1.09 | | |
| 11 | −38.904 | 0.50 | 1.77250 | 49.60 |
| 12 | 7.621 | 1.20 | 1.92286 | 18.90 |
| 13 | 49.043 | D13 | | |
| 14 (Stop) | ∞ | 0.50 | | |
| 15 (Aspheric Surface) | 5.642 | 0.89 | 1.52542 | 55.78 |
| 16 | 11.500 | D16 | | |
| 17 (Aspheric Surface) | 6.552 | 3.11 | 1.49700 | 81.61 |
| 18 (Aspheric Surface) | −9.612 | 0.20 | | |
| 19 | 6.397 | 1.34 | 1.58144 | 40.75 |
| 20 | 17849.043 | 0.50 | 1.80518 | 25.42 |
| 21 | 4.181 | D21 | | |
| 22 | −10.000 | 0.50 | 1.84666 | 23.78 |
| 23 | −24.983 | D23 | | |
| 24 | 50.000 | 1.44 | 1.83400 | 37.16 |
| 25 | −15.000 | 0.30 | | |
| 26 | ∞ | 1.55 | 1.51633 | 64.14 |
| 27 | ∞ | 0.34 | | |
| Image Plane | ∞ | | | |

Aspheric Data

2nd Surface

K = 0.000, A4 = 9.85824E−05, A6 = 6.58595E−07, A8 = −8.10558E−09

10th Surface

K = 0.000, A4 = −6.34676E−04, A6 = −1.11374E−05

15th Surface

K = 0.000, A4 = −6.23300E−04, A6 = −1.35901E−05

17th Surface

K = −0.300, A4 = −4.25303E−04, A6 = 2.05390E−05

18th Surface

K = 0.000, A4 = 9.11772E−04, A6 = 2.30953E−05

Zoom Data
Zoom Ratio 5.88

| | Wide-Angle | Intermediate | Telephoto |
|---|---|---|---|
| Focal Length | 5.07 | 12.87 | 29.81 |
| FNO. | 3.96 | 4.77 | 6.05 |
| Angle of View (2ω) | 82.44 | 32.62 | 14.44 |
| Image Hight | 3.84 | 3.84 | 3.84 |
| Full Lens Length | 49.73 | 49.73 | 49.71 |
| BF (in air) | 1.67 | 1.67 | 1.65 |
| D8 | 0.30 | 5.27 | 8.41 |
| D13 | 8.44 | 3.48 | 0.33 |
| D16 | 6.14 | 3.01 | 0.30 |
| D21 | 4.17 | 8.80 | 9.48 |
| D23 | 3.50 | 1.99 | 4.03 |

Numeral Example 4

Unit mm

Surface Data

| Surface No. | r | d | nd | vd |
|---|---|---|---|---|
| 1 | ∞ | 0.60 | 1.82115 | 24.06 |
| 2 (Aspheric Surface) | 16.412 | 1.90 | | |
| 3 | ∞ | 8.40 | 1.88300 | 40.76 |
| 4 | ∞ | 0.10 | | |
| 5 | 44.886 | 1.90 | 1.49700 | 81.61 |
| 6 | −15.759 | 0.10 | | |
| 7 | 12.511 | 1.79 | 1.57967 | 60.00 |
| 8 | −95.800 | D8 | | |
| 9 | −47.440 | 0.50 | 1.80610 | 40.92 |
| 10 (Aspheric Surface) | 4.491 | 1.20 | | |
| 11 | −11.015 | 0.50 | 1.77250 | 49.60 |
| 12 | 7.975 | 1.10 | 1.92286 | 18.90 |
| 13 | −146.256 | D13 | | |
| 14 (Stop) | ∞ | 0.50 | | |
| 15 (Aspheric Surface) | 7.498 | 0.94 | 1.69350 | 53.21 |
| 16 | 18.054 | D16 | | |
| 17 (Aspheric Surface) | 5.066 | 1.90 | 1.49700 | 81.61 |
| 18 (Aspheric Surface) | −21.380 | 1.50 | | |
| 19 | 20.244 | 1.14 | 1.59270 | 35.31 |
| 20 | −8.488 | 0.50 | 1.82115 | 24.06 |
| 21 (Aspheric Surface) | 9.236 | D21 | | |
| 22 | −15.848 | 0.50 | 1.80610 | 40.92 |
| 23 | 215.413 | D23 | | |
| 24 | 27.931 | 2.47 | 1.51000 | 60.00 |
| 25 (Aspheric Surface) | −6.937 | 0.30 | | |
| 26 | ∞ | 1.55 | 1.51633 | 64.14 |
| 27 | ∞ | 0.34 | | |
| Image Plane | ∞ | | | |

Aspheric Data

2nd Surface $K = 0.000, A4 = 9.13348E{-}05, A6 = 1.43222E{-}07, A8 = -9.18067E{-}10$ 10th Surface $K = 0.000, A4 = -6.66705E{-}04, A6 = -3.13125E{-}05,$
$A8 = -2.13641E{-}07, A10 = 2.52527E{-}07$ 15th Surface $K = -1.004, A4 = 2.68471E{-}05$ 17th Surface $K = 0.000, A4 = -3.16813E{-}04, A6 = -2.84537E{-}06,$
$A8 = 2.10723E{-}07$ 18th Surface $K = 0.000, A4 = 1.47368E{-}04, A6 = 1.65817E{-}05$ 21th Surface $K = 0.000, A4 = 2.08213E{-}03, A6 = 6.78512E{-}05, A8 = 1.85266E{-}06,$
$A10 = 1.00078E{-}06$ 25th Surface $K = 0.000, A4 = 1.38985E{-}03, A6 = -2.00951E{-}05, A8 = 2.97973E{-}07$

Zoom Data
Zoom Ratio 9.80

| | Wide-Angle | Intermediate | Telephoto |
|---|---|---|---|
| Focal Length | 5.00 | 15.65 | 49.00 |
| FNO. | 4.31 | 5.57 | 7.21 |
| Angle of View (2ω) | 84.24 | 27.06 | 8.78 |
| Image Hight | 3.84 | 3.84 | 3.84 |
| Full Lens Length | 55.73 | 55.73 | 55.73 |
| BF (in air) | 1.69 | 1.66 | 1.61 |
| D8 | 0.34 | 5.54 | 9.16 |
| D13 | 9.12 | 3.92 | 0.30 |
| D16 | 8.32 | 3.85 | 0.47 |
| D21 | 1.77 | 8.76 | 9.67 |
| D23 | 6.94 | 4.45 | 6.95 |

Numeral Example 5

Unit mm

Surface Data

| Surface No. | r | d | nd | vd |
|---|---|---|---|---|
| 1 | 277.498 | 0.50 | 1.63493 | 23.90 |
| 2 (Aspheric Surface) | 12.000 | 1.90 | | |
| 3 | ∞ | 7.80 | 1.81600 | 46.62 |
| 4 | ∞ | 0.10 | | |
| 5 | 42.687 | 1.29 | 1.49700 | 81.61 |
| 6 | −17.015 | 0.10 | | |
| 7 | 9.176 | 1.46 | 1.52542 | 55.78 |
| 8 | −95.983 | D8 | | |
| 9 | 108.490 | 0.30 | 1.88300 | 40.76 |
| 10 | 6.429 | 0.85 | | |
| 11 | −16.840 | 0.50 | 1.74100 | 52.64 |
| 12 | 5.537 | 0.97 | 1.92286 | 18.90 |
| 13 | 15.655 | D13 | | |
| 14 (Stop) | ∞ | D14 | | |
| 15 (Aspheric Surface) | 6.576 | 0.98 | 1.52542 | 55.78 |
| 16 | 33.398 | D16 | | |
| 17 | 6.252 | 1.81 | 1.49700 | 81.61 |
| 18 | −16.372 | 0.30 | | |
| 19 (Aspheric Surface) | 6.002 | 1.33 | 1.52542 | 55.78 |
| 20 | ∞ | 0.50 | 1.63493 | 23.90 |
| 21 (Aspheric Surface) | 4.524 | D21 | | |
| 22 | −10.000 | 0.50 | 1.52542 | 55.78 |
| 23 | 335.543 | D23 | | |
| 24 | 30.000 | 1.45 | 1.52542 | 55.78 |
| 25 | −15.000 | 0.30 | | |
| 26 | ∞ | 1.55 | 1.51633 | 64.14 |
| 27 | ∞ | 0.34 | | |
| Image Plane | ∞ | | | |

Aspheric Data

2nd Surface $K = 0.000, A4 = 9.48568E{-}05$

15th Surface $K = 0.000, A4 = -6.59915E{-}04, A6 = -5.14679E{-}06$

19th Surface $K = 0.000, A4 = -2.85433E{-}04, A6 = -4.31777E{-}05,$
$A8 = -6.66869E{-}06$ 21th Surface $K = 0.000, A4 = 1.81842E{-}03, A6 = 5.94070E{-}05, A8 = -1.31834E{-}05$

Zoom Data
Zoom Ratio 3.90

| | Wide-Angle | Intermediate | Telephoto |
|---|---|---|---|
| Focal Length | 5.47 | 13.88 | 21.31 |
| FNO. | 3.50 | 4.81 | 5.96 |
| Angle of View (2ω) | 78.00 | 30.76 | 20.04 |
| Image Hight | 3.84 | 3.84 | 3.84 |
| Full Lens Length | 41.73 | 41.72 | 41.73 |
| BF (in air) | 1.67 | 1.66 | 1.67 |
| D8 | 0.29 | 3.77 | 5.07 |
| D13 | 3.76 | 1.11 | 0.60 |
| D14 | 2.00 | 1.16 | 0.40 |
| D16 | 4.94 | 1.70 | 0.30 |
| D21 | 4.92 | 7.66 | 8.05 |
| D23 | 1.50 | 2.00 | 3.00 |

Numeral Example 6

Unit mm

Surface Data

| Surface No. | r | d | nd | vd |
|---|---|---|---|---|
| 1 | 220.658 | 0.50 | 1.63493 | 23.90 |
| 2 (Aspheric Surface) | 12.198 | 1.90 | | |
| 3 | ∞ | 7.80 | 1.81600 | 46.62 |
| 4 | ∞ | 0.10 | | |
| 5 | 37.263 | 1.24 | 1.49700 | 81.61 |
| 6 | −17.820 | 0.10 | | |
| 7 | 9.132 | 1.36 | 1.52542 | 55.78 |
| 8 | −151.105 | D8 | | |
| 9 | −133.261 | 0.30 | 1.88300 | 40.76 |
| 10 | 6.357 | 0.85 | | |
| 11 | −14.627 | 0.50 | 1.77250 | 49.60 |
| 12 | 5.667 | 0.97 | 1.92286 | 18.90 |
| 13 | 19.219 | D13 | | |
| 14 (Stop) | ∞ | D14 | | |
| 15 (Aspheric Surface) | 7.141 | 0.99 | 1.52542 | 55.78 |
| 16 | 84.808 | D16 | | |
| 17 | 6.271 | 1.86 | 1.49700 | 81.61 |
| 18 | −16.417 | 0.30 | | |
| 19 (Aspheric Surface) | 6.041 | 1.37 | 1.52542 | 55.78 |
| 20 | ∞ | 0.50 | 1.63493 | 23.90 |
| 21 (Aspheric Surface) | 4.510 | D21 | | |
| 22 | −10.000 | 0.50 | 1.52542 | 55.78 |
| 23 | 483.582 | D23 | | |
| 24 | 30.000 | 1.44 | 1.52542 | 55.78 |
| 25 | −15.000 | 0.36 | | |
| 26 | ∞ | 1.55 | 1.51633 | 64.14 |
| 27 | ∞ | 0.34 | | |
| Image Plane | ∞ | | | |

Aspheric Data

2nd Surface

K = 0.000, A4 = 8.26967E−05

15th Surface

K = 0.000, A4 = −5.95864E−04, A6 = −1.61120E−06

19th Surface

K = 0.000, A4 = −2.87785E−04, A6 = −4.24082E−05,
A8 = −6.46386E−06

21th Surface

K = 0.000, A4 = 1.75984E−03, A6 = 5.35614E−05, A8 = −1.35560E−05

Zoom Data
Zoom Ratio 3.90

| | Wide-Angle | Intermediate | Telephoto |
|---|---|---|---|
| Focal Length | 5.43 | 13.80 | 21.15 |
| FNO. | 3.51 | 5.25 | 6.03 |
| Angle of View (2ω) | 78.58 | 31.02 | 20.18 |
| Image Hight | 3.84 | 3.84 | 3.84 |
| Full Lens Length | 41.73 | 41.71 | 41.71 |
| BF (in air) | 1.73 | 1.71 | 1.72 |
| D8 | 0.30 | 3.32 | 5.18 |
| D13 | 3.53 | 1.21 | 0.60 |
| D14 | 2.00 | 0.89 | 0.40 |
| D16 | 5.33 | 1.63 | 0.30 |
| D21 | 4.74 | 8.36 | 7.92 |
| D23 | 1.50 | 2.00 | 3.00 |

FIGS. 7 to 12 are sets of aberration diagrams (a) at the wide-angle end, (b) in the intermediate focal length setting and (c) at the telephoto end for spherical aberrations (SA), field curvature (FC), distortion (DT) and chromatic aberration of magnification (CC) of the imaging optical systems or zoom lenses of Examples 1 to 6 upon focusing an infinite object point.

Given to spherical aberrations and chromatic aberration of magnification are numeral values at the respective wavelengths of 435.84 nm (g-line: a one-dotted chain line), 587.56 nm (d-line: a solid line) and 656.27 nm (C-line: a broken line). Astigmatism is shown with the sagittal image plane as a solid line and the meridional image plane as a dotted line. Note here that FNO is the F-number, and ω is the half angle of view.

Tabulated below are the values of Conditions (1) to (15) in the examples.

| Condition | Example 1 | Example 2 | Example 3 |
|---|---|---|---|
| (1) | −1.245 | −1.158 | −1.639 |
| (2) | −2.261 | −2.631 | −3.659 |
| (3) | −0.326 | −0.389 | −0.373 |
| (4) | −2.720 | −2.331 | −0.095 |
| (5) | 1.111 | 1.808 | 1.001 |
| (6) | −0.408 | −0.776 | −0.374 |
| (7) | 0.150 | 0.985 | 0.002 |
| (8) | 0.003 | 0.022 | 0.000 |
| (9) | 0.423 | 1.255 | 0.183 |
| (10) | 0.809 | 0.405 | 0.998 |
| (11) | 2.351 | 1.317 | 3.440 |
| (12) | 0.398 | 0.680 | 0.264 |
| (13) | 8.562 | 18.094 | 3.430 |
| (14) | 0.398 | 0.680 | 0.264 |
| (15) | 0.477 | −0.132 | 0.863 |

| Condition | Example 4 | Example 5 | Example 6 |
|---|---|---|---|
| (1) | −1.431 | −0.960 | −0.969 |
| (2) | −3.944 | −3.380 | −3.433 |
| (3) | −0.671 | −0.867 | −0.881 |
| (4) | −4.774 | −7.124 | −6.892 |
| (5) | 1.050 | 1.891 | 1.809 |
| (6) | −0.220 | −0.265 | −0.263 |
| (7) | 0.105 | 0.274 | 0.276 |
| (8) | 0.003 | 0.018 | 0.018 |
| (9) | 0.440 | 0.612 | 0.599 |
| (10) | 0.868 | 0.500 | 0.500 |
| (11) | 3.851 | 2.592 | 2.624 |
| (12) | 0.410 | 0.377 | 0.378 |
| (13) | 4.527 | 6.237 | 6.124 |
| (14) | 0.410 | 0.377 | 0.378 |
| (15) | 2.335 | 0.942 | 0.959 |

Figure 13:
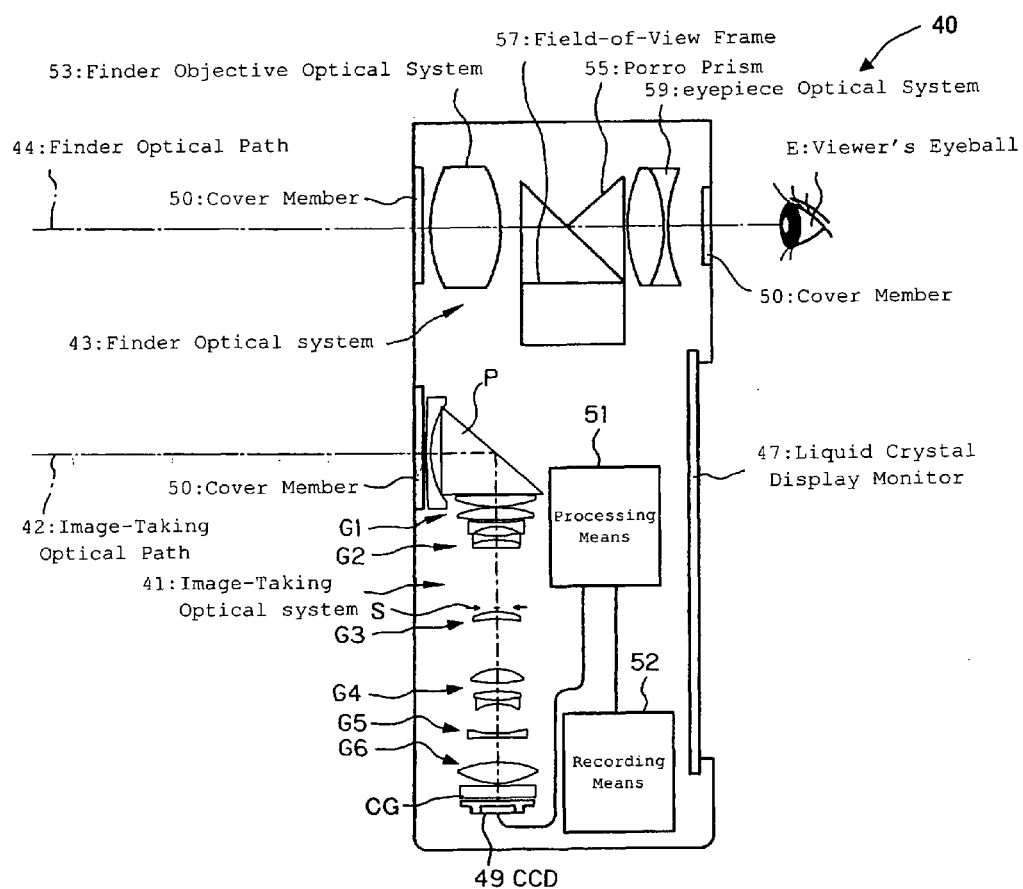
FIG. 13 is a sectional view of the digital camera 40 taking the form of the electronic imaging apparatus incorporating the inventive zoom lens.

FIG. 13 is a sectional view of the makeup of a digital camera working as an imaging apparatus, in which the zoom lens according to one embodiment of the invention is built into the image-taking optical system 41.

In this embodiment, the digital camera 40 includes an image-taking optical system 41 having an image-taking optical path 42, a finder optical system 43 having a finder optical path 44, a shutter 45, a flash 46, a liquid crystal display monitor 47, and so on. As the shutter 45 located on the upper portion of the camera 40 is pressed down, it causes images to be taken through the image-taking optical system 41, for instance, the zoom lens of Example 1.

An object image formed through the image-taking optical system 41 is formed on the imaging plane of a CCD, CMOS or other imaging device 49 via a cover glass CG. The object image received on the CCD, CMOS or other imaging device 49 is displayed as an electronic image on the liquid crystal display monitor (LCD) 47 located on the back of the camera via a processing means (such as CPU) 51. That processing means 51 may be connected with a recording means (such as a memory) 52 for the recording of taken electronic images. It is here to be noted that the recording means 52 may be provided separately from the processing means 51 or, alternatively, it may be designed in such a way as to implement electronic recording or writing on floppy (registered trademark) discs, memory cards, MOs, DVDs±RWs or the like. If silver halide film is provided in place of CCD 49 or the like, then the digital camera may be set up as a silver-halide camera.

Moreover, a finder objective optical system 53 is located on the finder optical path 44. An object image formed by the finder objective optical system 53 is formed on a field-of-view frame 57 for a Porro prism 55 that is an image erecting member. In the rear of this Porro prism 55 there is an eyepiece optical system 59 located for guiding the erected, orthoscopic image onto the viewer's eyeball E. It is here to be noted that a cover member 50 is located on the entrance side of the image-taking optical system 41 and finder objective optical system 53, and on the exit side of the eyepiece optical system 59.

Figure 14:
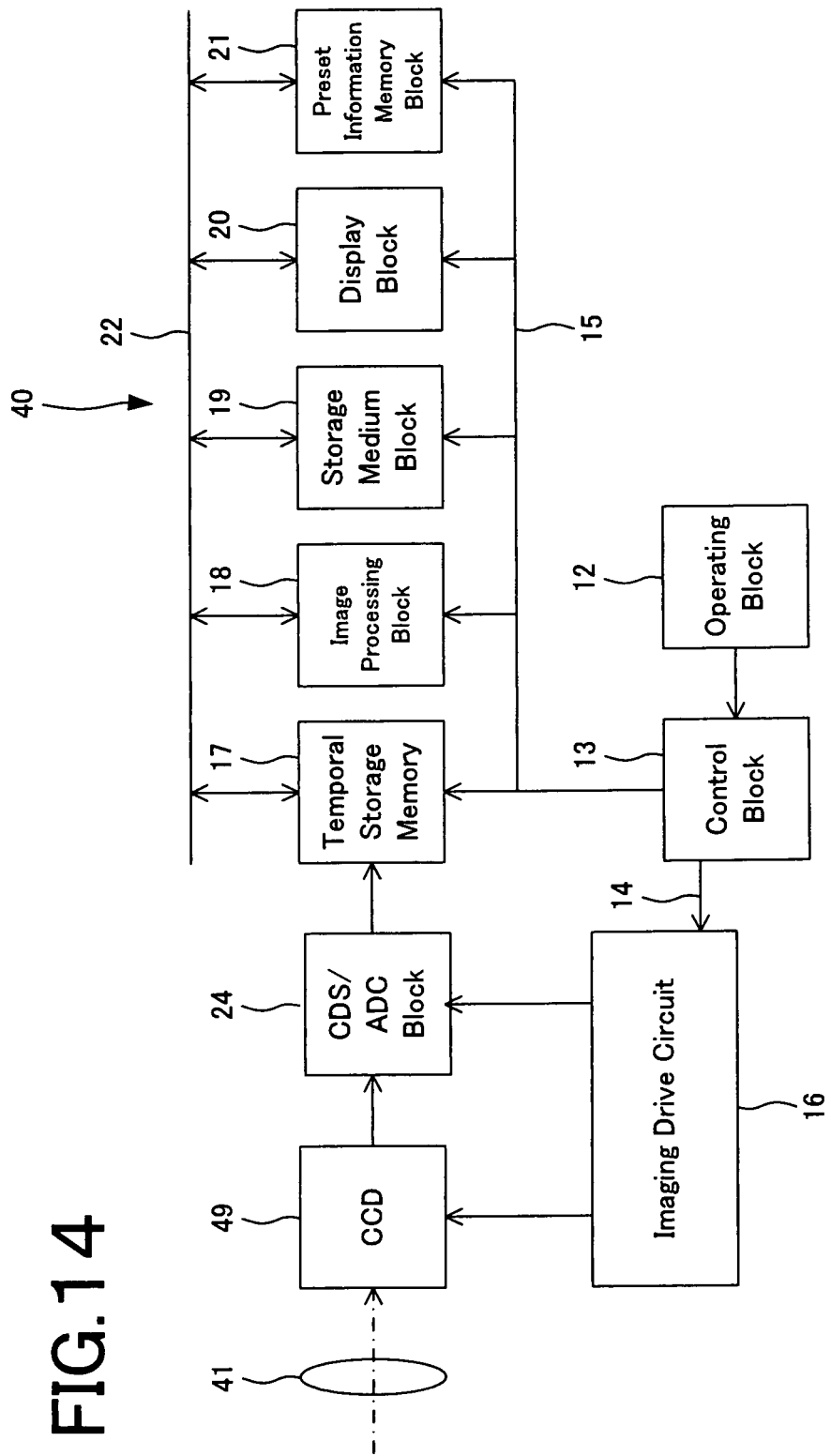
FIG. 14 is a block diagram illustrative of the internal circuitry of a main part of the digital camera.

FIG. 14 is a block diagram for the internal circuitry in the main part of the digital camera 40. In what follows, the aforesaid processing means shown by 51 is made up of a CDS/ADC block 24, a temporary storage memory 17, an image processing block 18, etc., and a storage means 52 is made up of a storage medium block, etc.

As shown in FIG. 14, the digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block 13. The control block 13 is a central computing unit that is made up of typically a CPU and has a built-in program memory (not shown): it is a circuit that, according to the program loaded in that program memory, receives commands entered by the camera operator via the operating block 12 to have control over the digital camera 40.

The CCD 49 receives an object image formed through the image-taking optical system 41. More specifically, the CCD 49 is an imaging device that is driven and controlled by the imaging drive circuit 16 to convert light quantity per pixel of that object image into electrical signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of an SDRAM, etc.: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing inclusive of distortion correction based on an image quality parameter instructed by the control block 13.

The storage medium block 19 is a control circuit for a device that detachably receives a card type or stick type recording medium comprising typically a flash memory so that the RAW data transferred from the temporal storage memory 17 or image data processed at the image processing block 18 are recorded and held in that card type or stick type storage medium.

The display block 20 is a circuit for displaying images, operating menus or the like on the liquid crystal display monitor 47. The preset information storage memory block 21 includes a ROM sub-block having various image quality parameters previously loaded in it, and a RAM sub-block for storing an image quality parameter selected from among image quality parameters read out of that ROM sub-block by entering operation of the operating block 12. The preset information storage memory block 21 is a circuit for controlling inputs to or outputs out of those memories.

The thus assembled digital camera 40, because the inventive zoom lens is used as the imaging optical system 41, may be used as a small-format imaging apparatus well fit for the taking of moving images.

While various embodiments of the invention have been explained, it is to be understood that the present invention is never limited to them alone, and embodiments comprising combinations of the essential requirements and limitations are embraced in the category of those embodiments too.

What is claimed is:

1. A zoom lens, comprising, in order from an object side thereof, a first lens group having positive refracting power, a second lens group having negative refracting power, a third lens group having positive refracting power, a fourth lens group having positive refracting power, a fifth lens group having negative refracting power, and a sixth lens group having positive refracting power, wherein:

the first lens group includes a reflective optical element, and the fourth lens group has a plurality of lens components in which a most image side lens component of the plurality of lens components has negative refracting power.

2. The zoom lens according to claim 1, wherein the fifth lens group is movable during zooming from a wide-angle end to a telephoto end, and focusing.

3. The zoom lens according to claim 1, which satisfies the following Condition (1):

$$-3 \leq F_{G5}/F_{G6} \leq -0.91 \tag{1}$$

where $F_{G5}$ is a focal length of the fifth lens group, and $F_{G6}$ is a focal length of the sixth lens group.

4. The zoom lens according to claim 1, which satisfies the following Condition (2):

$$-6 \leq F_{G5}/F_W \leq -2.2 \tag{2}$$

where $F_{G5}$ is a focal length of the fifth lens group, and $F_W$ is a focal length of the zoom lens at a wide-angle end.

5. The zoom lens according to claim 1, which satisfies the following Condition (3):

$$-1.50 \leq F_{G5}/F_T \leq -0.32 \tag{3}$$

where $F_{G5}$ is a focal length of the fifth lens group, and $F_T$ is a focal length of the zoom lens at a telephoto end.

6. The zoom lens according to claim 1, which satisfies the following Condition (4):

$$-15 \leq (R_{G4L}+R_{G4M})/(R_{G4L}-R_{G4M}) \leq -1.5 \tag{4}$$

where $R_{G4M}$ is s radius of curvature of an object-side surface of the lens component in and on the most image side of the fourth lens group, and $R_{G4L}$ is a radius of curvature of an image-side surface of the lens component in and on the most image side of the fourth lens group.

7. The zoom lens according to claim 1, which satisfies the following Condition (5):

$$0.9 \le F_{W5G6G}/F_{T5G6G} \le 2.3 \quad (5)$$

where $F_{W5G6G}$ is a combined focal length of the fifth lens group and the sixth lens group at a wide-angle end, and $F_{T5G6G}$ is a combined focal length of the fifth lens group and the sixth lens group at a telephoto end.

8. The zoom lens according to claim 1, which satisfies the following Condition (6):

$$0.95 \le MG_{G5T}/MG_{G5W} \le 1.25 \quad (6)$$

where $MG_{G5W}$ is a transverse magnification of the fifth lens group at a time when the zoom lens is at a wide-angle end, and $M_{G5T}$ is a transverse magnification of the fifth lens group at a time when the zoom lens is at a telephoto end.

9. The zoom lens according to claim 1, which satisfies the following Condition (7):

$$-0.5 \le \Delta L_{G5}/F_W \le 1 \quad (7)$$

where $\Delta L_{G5}$ is a difference between a distance from the surface in and on the most image side of the fifth lens group to an image plane at a time when the zoom lens is at a wide-angle end and a distance from the surface in and on the most image side of the fifth lens group to the image plane at a time when the zoom lens is at a telephoto end, and $F_W$ is a focal length of the whole zoom lens optical system at the wide-angle end.

10. The zoom lens according to claim 1, which satisfies the following Condition (8):

$$-0.005 \le (\Delta L_{G5}/F_W)/M^2 \le 0.023 \quad (8)$$

where $\Delta L_{G5}$ is a difference between a distance from the surface in and on the most image side of the fifth lens group to an image plane at a time when the zoom lens is at a wide-angle end and a distance from the surface in and on the most image side of the fifth lens group to the image plane at a time when the zoom lens is at a telephoto end, $F_W$ is a focal length of the whole zoom lens optical system at the wide-angle end, and M is an optical magnification of the zoom lens.

11. The zoom lens according to claim 1, which satisfies the following Condition (9):

$$0.15 \le L_{Wg4G5}/L_{TG4G5} 1.7 \quad (9)$$

where $L_{WG4G5}$ is an air separation distance between the fourth lens group and the fifth lens group at a wide-angle end of the zoom lens, and $L_{TG4G5}$ is an air separation distance between the fourth lens group and the fifth lens group at a telephoto end of the zoom lens.

12. The zoom lens according to claim 1, which satisfies the following Condition (10):

$$0.3 \le L_{WG5G6}/L_{TG5G6} \le 1.8 \quad (10)$$

where $L_{WG5G6}$ is an air separation distance between the fifth lens group and the sixth lens group at a wide-angle end of the zoom lens, and $L_{TG5G6}$ is an air separation distance between the fifth lens group and the sixth lens group at a telephoto end of the zoom lens.

13. The zoom lens according to claim 1, wherein the surface in and on the most image side of the fourth lens group is a surface concave on its image side.

14. The zoom lens according to any one of claim 1, wherein:
upon zooming a wide-angle end to a telephoto end, a separation between the first lens group and the second lens group grows wide, a separation between the second lens group and the third lens group becomes narrow, a separation between the third lens group and the fourth lens group becomes narrow, a separation between the fourth lens group and the fifth lens group changes, and a separation between the fifth lens group and the sixth lens group changes.

15. The zoom lens according to claim 1, wherein the fifth lens group moves in a convex orbit toward an image side upon zooming from a wide-angle end to a telephoto end.

16. The zoom lens according to claim 1, wherein the surface in and on the most object side of the fifth lens group is a surface concave on its object side.

17. The zoom lens according to claim 1, which satisfies the following Condition (11):

$$1.1 \le F_{G5}/F_{G4Ln} \le 5 \quad (11)$$

where $F_{G5}$ is a focal length of the fifth lens group in the zoom lens, and $F_{G4Ln}$ is a focal length of the negative lens in and on the most image side of the fourth lens group in the zoom lens.

18. The zoom lens according to claim 1, which satisfies the following Condition (12):

$$0.1 \le (R_{G5S}+R_{G4L})/(R_{G5S}-R_{G4L}) \le 0.9 \quad (12)$$

where $R_{G5S}$ is a radius of curvature of the surface in and on the most object side of the fifth lens group, and $R_{G4L}$ is a radius of curvature of the surface in and on the most image side of the fourth lens group.

19. The zoom lens according to claim 1, wherein the sixth lens group remains fixed during zooming.

20. The zoom lens according to claim 1, which satisfies the following Condition (13):

$$1.9 \le |(R_{G4L}+R_{G4S})/(R_{G4L}-R_{G4S})| \quad (13)$$

where $R_{G4S}$ is a radius of curvature of the surface in and on the most object side of the fourth lens group, and $R_{G4L}$ is a radius of curvature of the surface in and on the most image side of the fourth lens group.

21. The zoom lens according to claim 1, wherein the second lens group includes at least two negative lenses located back-to-back and side-by-side.

22. An electronic imaging apparatus, comprising:
a zoom lens as recited in claim 1, and
an imaging device located on an image side of the zoom lens and having an imaging plane for converting an optical image into electrical signals.

* * * * *

UNITED STATES PATENT AND TRADEMARK OFFICE
CERTIFICATE OF CORRECTION

PATENT NO.       : 8,599,491 B2
APPLICATION NO.  : 13/200089
DATED            : December 3, 2013
INVENTOR(S)      : Toyoki Kon et al.

It is certified that error appears in the above-identified patent and that said Letters Patent is hereby corrected as shown below:

On the title page item (73), "Olympus Imaging Corp." should be changed to --Olympus Corporation--.

Signed and Sealed this
Twentieth Day of January, 2015

Michelle K. Lee
*Deputy Director of the United States Patent and Trademark Office*